(12) United States Patent
Zhang et al.

(10) Patent No.: US 12,407,611 B2
(45) Date of Patent: Sep. 2, 2025

(54) REDUCING CONVERGENCE TIME AND/OR AVOIDING SPLIT-BRAIN IN MULTI-HOMED ETHERNET SEGMENT DEPLOYMENTS, SUCH AS ESI-LAG DEPLOYMENTS

(71) Applicant: Juniper Networks, Inc., Sunnyvale, CA (US)

(72) Inventors: Zhaohui Zhang, Westford, MA (US); SelvaKumar Sivaraj, Sunnyvale, CA (US); Pavana C V, Bangalore (IN); M Ganesh Prasad, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 431 days.

(21) Appl. No.: 18/095,252

(22) Filed: Jan. 10, 2023

(65) Prior Publication Data
US 2024/0235999 A1  Jul. 11, 2024

(51) Int. Cl.
*H04L 45/76* (2022.01)
*H04L 12/46* (2006.01)
*H04L 45/02* (2022.01)

(52) U.S. Cl.
CPC .......... *H04L 45/76* (2022.05); *H04L 12/4641* (2013.01); *H04L 45/02* (2013.01)

(58) Field of Classification Search
CPC ...... H04L 45/76; H04L 12/4641; H04L 45/02
USPC .......................................................... 370/389
See application file for complete search history.

(56) References Cited

U.S. PATENT DOCUMENTS

| | | | |
|---|---|---|---|
| 9,178,816 B1 * | 11/2015 | Ojha | H04L 12/4641 |
| 9,860,169 B1 * | 1/2018 | Ninan | H04L 45/033 |
| 2021/0352007 A1 * | 11/2021 | Boutros | H04L 45/66 |
| 2021/0352011 A1 * | 11/2021 | Boutros | H04L 45/48 |
| 2022/0200903 A1 * | 6/2022 | Boutros | H04L 45/50 |
| 2024/0235999 A1 * | 7/2024 | Zhang | H04L 45/02 |
| 2025/0080452 A1 * | 3/2025 | Sharma | H04L 45/04 |

FOREIGN PATENT DOCUMENTS

| | | | | |
|---|---|---|---|---|
| EP | 3641240 A1 * | 4/2020 | ......... | H04L 12/1868 |
| EP | 3641241 A1 * | 4/2020 | ......... | H04L 12/4633 |

* cited by examiner

*Primary Examiner* — Anthony Mejia
(74) *Attorney, Agent, or Firm* — John C. Pokotylo; Pokotylo Patent Services

(57) ABSTRACT

In an Ethernet Virtual Private Network (EVPN) with a multi-homed Ethernet Segment (MHES), potential problems of core isolation are avoided in a way that also avoids the potential "split brain" problems.

20 Claims, 19 Drawing Sheets

FIGURE 2A (Prior Art)

| INNER MAC DESTINATION ADDRESS | INNER MAC SOURCE ADDRESS | IEEE 802.1Q (OPTIONAL) | ORIGINAL ETHERNET PAYLOAD | IEEE 802.1Q (OPTIONAL) |

FIGURE 2B (Prior Art)

| OUTER MAC DESTINATION ADDRESS | OUTER MAC SOURCE ADDRESS | OUTER IEEE 802.1Q | OUTER IP SOURCE ADDRESS | OUTER IP DESTINATION ADDRESS | OUTER UDP | VNI (24 BITS) |

FIGURE 2C (Prior Art)

| MPLS OUTER MAC DESTINATION ADDRESS | MPLS OUTER MAC SOURCE ADDRESS | MPLS ETYPE | MPLS TUNNEL LABEL | MPLS EVPN LABEL |

850

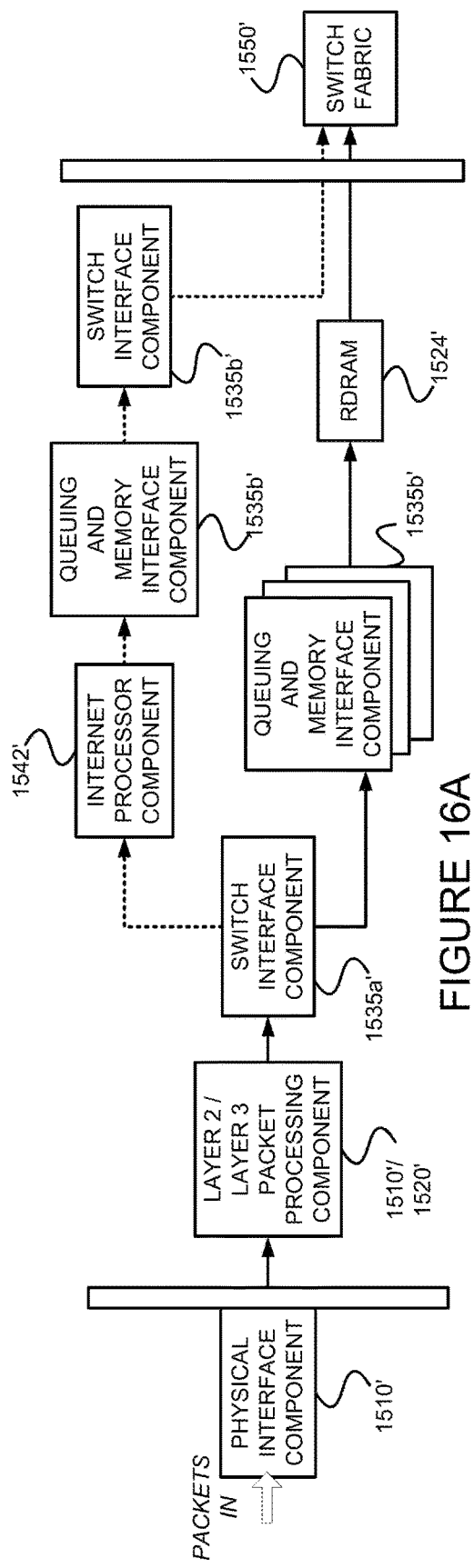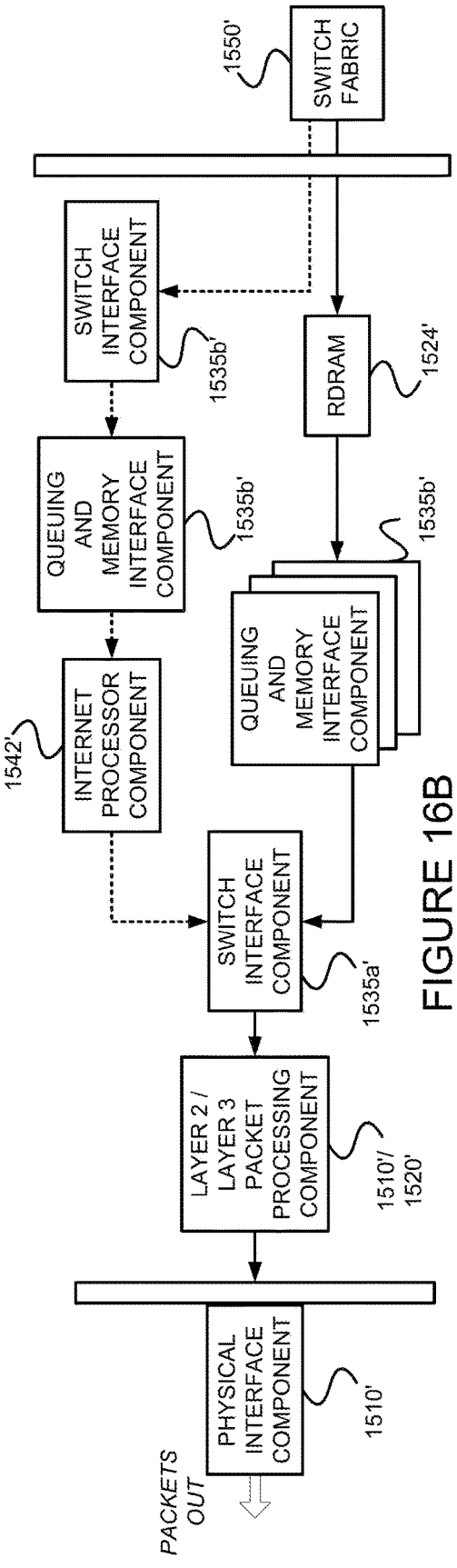

REDUCING CONVERGENCE TIME AND/OR AVOIDING SPLIT-BRAIN IN MULTI-HOMED ETHERNET SEGMENT DEPLOYMENTS, SUCH AS ESI-LAG DEPLOYMENTS

§ 1. BACKGROUND OF THE INVENTION

§ 1.1 Field of the Invention

The present description concerns communications over networks. In particular, the present description concerns avoiding (e.g., L3/multicast) traffic loss, avoiding unnecessary ARP/ND, and/or avoiding unnecessary flooding in an Ethernet Virtual Private Network (EVPN), such as an EVPN with Virtual Extensible Local Area Network (VXLAN) encapsulation.

§ 1.2 Background Information

§ 1.2.1 Network Virtualization Using Overlays

Virtualization is essentially the abstraction of physical resources to support multitenancy, allowing for fully isolated and distributed workload environments. Different computing resources like operating systems, storage devices, or network components can be virtualized to offer better scalability and flexibility. Server virtualization and network virtualization are introduced below.

Network virtualization provides software abstraction for network resources by replicating network attributes (like routing, switching, firewall/micro segmentation, load balancing, etc.), allowing virtual networks to be created by using these attributes. Using the same physical network resources, multiple virtual networks to support multiple tenants can be created. Network virtualization offers many benefits such as, for example, automation to ease provisioning, elasticity to support dynamic changes and fully utilize deployed resources, security through complete isolation of network segments, and centralized management of both virtual and network infrastructure.

Virtual LANs (VLANs) have traditionally allowed for multi-tenancy by abstracting the LAN segment for network partitioning. Each VLAN corresponds to a unique IP subnet (separate broadcast domain). In legacy data center designs, a VLAN is logically equivalent to a tenant or a service. For example, accommodating 10 tenants would be equivalent to provisioning 10 different VLANs. VLAN trunks over the physical network infrastructure connect servers to allow for application communications that reside on virtual machines or containers.

With increasing application demands, scalability, elasticity, and ease of provisioning in hybrid (physical and virtual) environments have become critical data center requirements. With the use of VLANs, network resources become a bottleneck in realizing these requirements.

An overlay network virtualizes the underlying physical infrastructure by creating logical networks over the physical underlay network. It decouples the offered service from the underlying transport and lifts the necessity for the transit devices to maintain state, which improves scalability. Maintenance of state is now confined only to overlay endpoints responsible for virtual tunnel encapsulation/decapsulation (for example, server hypervisor or top-of-rack (TOR)). Transit devices can have smaller forwarding tables as they forward traffic using the outer encapsulation or transport header that contains underlay addresses only. This decoupling offers the added advantage of faster virtual network provisioning without the need to configure the traversed physical devices. Example types of network overlays are described in § 1.2.1.1 below.

The underlying infrastructure is transparent to application services which use the virtual tunnels provided by the overlay to communicate with each other. The underlay provides a service to the overlay by simply transporting encapsulated tenant data between compute resources. In other words, underlay is responsible for tunnel endpoint reachability while complexity of virtual tunnel management is handled by the overlay. If the underlay is structured for scale and resiliency, it can provide optimal traffic paths that the overlay can leverage for better traffic management and distribution. Example types of network underlays are described in § 1.2.1.2 below.

§ 1.2.1.1 Types of Network Overlays

A data center fabric based on Clos architectures is defined as a matrix of tightly woven interconnections between network devices that resembles a fabric. It allows for a flattened architecture with equidistant endpoints and a non-blocking core to support low latency and high bandwidth for both "East-West" and "North-South" traffic. Data center fabrics are a popular choice for network underlay. These could be broadly categorized as: (A) Ethernet fabrics (e.g., QFabric, Virtual Chassis Fabric (VCF), and Junos Fusion from Juniper Networks of Sunnyvale, CA); (B) MPLS fabric (e.g., using MPLS signaling protocols like LDP, RSVP, or BGP-LU); (C) IP fabric; (D) iBGP; and (E) eBGP.

§ 1.2.1.2 Types of Network Underlays

Overlay networks create communication channels between tenant applications/services through the creation of logical/virtual tunnels. These can support L2 (L2 overlays—extend L2 network so VMs can share the same IP subnet) and L3 (L3 overlays—share L3 networks) transport between services while hiding the same from the underlying network infrastructure.

Tunnel encapsulation includes a tenant ID which is a function of the overlay network and acts as a demultiplexor used to distinguish between different traffic streams carried over the tunnel, each stream representing a different service. Each communication channel includes a control plane to exchange tenant application topology information (e.g., MAC addresses/IP routes) and data plane encapsulation to encapsulate and forward traffic between overlay tunnel endpoints across the virtual tunnel. Examples for control plane include, for example, OVSDB and EVPN. Examples of data plane encapsulation include, for example, MPLSoMPLS, MPLSoGRE, MPLSoUDP, and VXLAN

§ 1.2.2 EVPN with VXLAN Data Plane Encapsulation

Ethernet VPNs (EVPNs) enable service providers to connect groups of dispersed customer sites using Layer 2 virtual bridges. Virtual Extensible LANs (VXLANs) allow service providers to stretch Layer 2 connectivity over an intervening Layer 3 network, while providing network segmentation like a VLAN, but without scaling limitations of traditional VLANs.

EVPN with VXLAN encapsulation handles Layer 2 connectivity at the scale required by cloud server providers and may be used to replace limiting protocols like Spanning Tree Protocol (STP), freeing up the Layer 3 network to use more robust routing protocols.

Although they are understood by those skilled in the art, virtual private networks (VPNs), such as EVPNs, VXLANs, and the integration of EVPNs and VXLANs are introduced below for the reader's convenience.

§ 1.2.2.1 Virtual Private Networks (Vpns)

EVPN is a standards-based technology (See, e.g., A. Sajassi, Ed., "BGP MPLS-Based Ethernet VPN," *Request for Comments:* 7432 (Internet Engineering Task Force, February 2015), incorporated herein by reference.) that provides virtual multipoint bridged connectivity between different Layer 2 domains over an Internet Protocol (IP) or Internet Protocol/Multiprotocol Label Switching (IP/MPLS) backbone network. In this example, EVPN can be thought of as an "overlay network" and IP/MPLS can be thought of as an "underlay network." Like other VPN technologies, such as IP VPN and virtual private LAN service (VPLS), EVPN instances are configured on provider edge (PE) routers to maintain logical service separation between customers. The PE routers connect to customer edge (CE) devices, which can be routers, switches, hosts, etc. The PE routers then exchange reachability information using Multiprotocol Border Gateway Protocol (MP-BGP). Encapsulated traffic is forwarded between PE routers. The EVPN architecture shares some common elements with other VPN technologies. This makes it easier to seamlessly introduce and integrate an EVPN into existing service environments.

FIG. 1 illustrates an example of a conventional network topology 100 in which an EVPN provides a transport service to customers via customer edge devices CE 1 and CE 2. The example EVPN includes provider edge devices PE 1, PE 2 and PE 3, as well as a border gateway protocol (BGP) route reflector. Control plane learning may occur within the EVPN among the provider edge devices (PEs). Data plane learning may occur between customer edge devices (CEs) and provider edge devices (PEs). CE 1 is said to be multi-homed to the EVPN via PE 1 and PE 2. The two links, which may be part of a link aggregation group (LAG) may be thought of as a common Ethernet segment (ES), which is identified by the Ethernet segment identifier (ESI) 00:11:22:33:44:55:66: 77:88:99. The provider edge devices PE 1, PE 2 and PE 3 belong to the same EVPN instance (EVI).

The EVPN is often used as a Layer 2 overlay solution to provide Layer 2 connection over an IP underlay for the endpoints within a virtual network whenever Layer 2 connectivity is required by an end station such as bare-metal server (BMS). Otherwise, Layer 3 routing is used, for example, through virtual routing and forwarding (VRF) tables. Advantageously, EVPN technology offers multi-tenancy, flexible services that can be extended on demand, frequently using compute resources of different physical data centers for a single service (Layer 2 extension).

EVPN's MP-BGP control plane enables service providers to dynamically move live virtual machines (VMs) from one data center to another (also known as "virtual machine (VM) motion". After a VM is moved to a destination server or "hypervisor" (that is, a program used to run and manage VMs on a computer(s)), it transmits a gratuitous address resolution protocol (ARP), which updates the Layer 2 forwarding table of the PE device at the destination data center. The PE device then transmits a MAC route update (e.g., via a Type 2 advertisement) to all remote PE devices which, in turn, update their forwarding tables. An EVPN tracks the movement of the VM, which is also known as MAC mobility.

EVPN also has mechanisms that detect and stop MAC flapping, and prevent the looping of broadcast, unknown unicast, and multicast (BUM) traffic in an all-active multi-homed topology.

The EVPN technology, similar to Layer 3 multiprotocol label switching (MPLS) VPNs, includes the concept of routing MAC addresses using an IP/MPLS core. EVPN provides benefits, such as, the ability to have an active multihomed edge device, aliasing, fast convergence, load balancing of traffic across dual-active links, MAC address mobility, and multitenancy. In addition, EVPN can use techniques such as multihoming, split horizon, local link bias, and EVPN with VXLAN encapsulation (or tunneling). Each of these techniques is introduced below.

Multihoming is used to provide redundancy in the event that an access link or one of the PE routing devices to which a CE device is connected, fails. In either case, traffic flows from the CE device towards the PE router using one or more remaining active links. For traffic in the other direction, the remote PE router updates its forwarding table to send traffic to the remaining active PE router(s) connected to the multihomed Ethernet segment (ES). EVPN provides a fast convergence mechanism, which reduces traffic restoration time so that the time it takes to make this adjustment is independent of the number of media access control (MAC) addresses learned by the PE router. "All-active" multihoming enables a CE device to connect to two or more PE routers such that traffic may be forwarded using all of the links between the devices. (Recall, for example, CE 1, PE 1 and PE 2 of FIG. 1.) This multihoming enables the CE device to load-balance traffic to multiple PE routers. Further, multihoming enables a remote PE router to load-balance traffic to the multihomed PE routers across the core network. This load balancing of traffic flows between data centers is known as aliasing, which causes different signals to become indistinguishable (that is, they become "aliases" of one another).

Split horizon prevents the looping of BUM traffic in a network. The split horizon basic principle is simple—information about the routing for a particular packet is never sent back in the direction from which it was received.

Local bias conserves bandwidth by using local links to forward unicast traffic exiting a Virtual Chassis or Virtual Chassis Fabric (VCF) that has a link aggregation group (LAG) bundle composed of member links on different member switches in the same Virtual Chassis or VCF. A local link is a member link in the LAG bundle that is on the member switch that received the traffic.

EVPN with VXLAN encapsulation is used for Layer 2 connectivity between virtual machines and a top-of-rack (TOR) switch within a Layer 2 domain. Certain routers can be used as a Layer 2 or Layer 3 VXLAN gateway.

§ 1.2.2.2 Virtual Extensible Local Area Networks (VXLANs)

VXLANs can be used to provide an "overlay" scheme that expands the Layer 2 network address space from about 4,000 to 16 million, largely solving the scaling issues seen in VLAN-based environments. Network overlays are created by encapsulating traffic and tunneling the traffic over a physical network. A number of different tunneling protocols may be used to create network overlays. The most common protocol in the context of data centers is presently VXLAN. VXLAN tunneling protocol encapsulates Layer 2 Ethernet frames (See, e.g., FIG. 2A.) in Layer 3 UDP packets. This encapsulation enables service providers to create virtual Layer 2 subnets or segments that can span physical Layer 3 networks.

In a VXLAN overlay network, a VXLAN network identifier (VNI) uniquely identifies each Layer 2 subnet or segment. A VNI segments traffic the same way that an IEEE 802.1Q VLAN ID segments traffic. As is the case with VLAN, virtual machines on the same VNI can communicate directly with each other, whereas virtual machines on different VNIs need a router to communicate with each other.

The entity that performs the encapsulation and de-encapsulation is called a VXLAN tunnel endpoint (VTEP). In the physical network, a device that functions as a Layer 2 or Layer 3 VXLAN gateway can encapsulate and de-encapsulate data packets. This type of VTEP is known as a "hardware VTEP." In the virtual network, VTEPs can reside in hypervisor hosts, such as kernel-based virtual machine (KVM) hosts. This type of VTEP is known as a "software VTEP."

Each VTEP has two interfaces. A first of the two interfaces is a switching interface that faces the virtual machines in the host and provides communication between VMs on the local LAN segment. A second of the two interfaces is an IP interface that faces the Layer 3 network.

Each VTEP has a unique IP address that is used for routing the UDP packets between VTEPs. For example, when a first VTEP (VTEP1) receives an Ethernet frame (Recall, e.g., FIG. 2A.) from VM1 addressed to VM3, it uses the VNI and the destination MAC to look up in its forwarding table which VTEP (in this example, a second VTEP (VTEP2)) it will send the packet to. It then adds a VXLAN header (See, e.g., FIG. 2B) that contains the VNI to the Ethernet frame, encapsulates the frame in a Layer 3 UDP packet, and routes the packet to VTEP2 over the Layer 3 network. VTEP2 de-encapsulates the original Ethernet frame and forwards it to VM3. VM1 and VM3 cannot detect the VXLAN tunnel and the Layer 3 network between them. That is, the VXLAN tunnel acts as a "transparent" LAN segment. For comparison, FIG. 2C illustrates a packet header in an MPLS network.

§ 1.2.2.3 EVPN-VXLAN Integration Overview

VXLAN defines a tunneling scheme to overlay Layer 2 networks on top of Layer 3 networks. This tunneling scheme allows for optimal forwarding of Ethernet frames with support for multipathing of unicast and multicast traffic with the use of UDP/IP encapsulation for tunneling, and is mainly used for the intra-data center site connectivity.

Referring to the example network topology 300 of FIG. 3, one characteristic of EVPNs is that MAC address learning between PE routers (PE1-PE4) occurs in the control plane. Responsive to a local PE router detecting a new MAC address from a CE device, it advertises (e.g., using MP-BGP) the address to all the remote PE routers. This method differs from existing Layer 2 VPN solutions such as VPLS, which learn by flooding unknown unicast in the data plane. This control plane MAC learning enables many benefits provided by EVPN. For example, since MAC learning is handled in the control plane, EVPN has the flexibility to support different data plane encapsulation technologies between PE routers. This flexibility is beneficial because not all backbone networks run MPLS, especially in enterprise networks.

EVPN addresses many of the challenges faced by network operators building data centers to offer cloud and virtualization services. The main application of EVPN is Data Center Interconnect (DCI), which refers to the ability to extend Layer 2 connectivity between different data centers that are deployed to improve the performance of delivering application traffic to end users and for disaster recovery. Although various DCI technologies are available, EVPN has advantages (such as active/active redundancy, aliasing, and mass MAC withdrawal) over other MPLS technologies. Consequently, it is useful to integrate VXLAN with EVPN to provide DCI.

As shown in FIG. 3, an EVPN is used as an interconnect to connect a VXLAN at data center site 1 and another VXLAN at data center site 2. Data center site 1 includes a top of rack (TOR) 1 coupled with servers identified by VLAN 1, MAC 1 and VLAN 2, MAC 2. Similarly, data center site 2 includes TOR 2 couple with servers identified by VLAN 1, MAC 11 and VLAN 2, MAC 12. Provider edge devices PE1 and PE2 of the EVPN act as gateways between the EVPN and the VXLAN at data center site 1, while PE3 and PE4 of the EVPN act as gateways between the EVPN and the VXLAN at data center cite 2. A first VXLAN tunnel between TOR 1 and PE2 and between TOR 2 and PE4 is extended by an EVPN tunnel between PE2 and PE4. Similarly, a second VXLAN tunnel between TOR 1 and PE1 and between TOR 2 and PE3 is extended by an EVPN tunnel between PE1 and PE3. Each VXLAN, which is connected to the MPLS or IP core, runs an independent instance of the interior gateway protocol (IGP) control plane. Each PE router participates in the IGP control plane instance of its VXLAN. In this example, each customer is a data center, so each has its own virtual router for VXLAN underlay.

Each PE node can terminate the VXLAN data plane encapsulation where the VXLAN network identifier (VNI) is mapped to a bridge domain or VLAN. The PE router performs data plane learning on the traffic received from the VXLAN.

Each PE node implements EVPN to distribute the client MAC addresses learned over the VXLAN tunnel into BGP. Each PE node encapsulates the VXLAN or Ethernet frames with MPLS when sending the packets over the MPLS core and with the VXLAN tunnel header when sending the packets over the VXLAN network.

§ 1.2.2.3.1 EVPN Type 2 Routes

As noted above, one characteristic of EVPN is that MAC address learning between PE routers occurs in the control plane. For example, Type 2 routes may be used to advertise MAC addresses and IP addresses that might be associated with the MAC addresses. First, a PE learns MAC addresses from any CEs attached directly to it (e.g., via normal data-plane learning mechanisms, although RFC 7432 also allows for MAC address learning via control plane interaction between PE and CE).

FIG. 4 illustrates a data structure 400 in accordance with a Type 2 route format. In the example data structure 400, a route distinguisher field 410, an ESI field 420, an Ethernet TAG ID field 430, a MAC address length field 440 and a MAC address field 450 are provided. An IP Address field 470 is optional and is set to zero by default. This field 470 might be populated if a PE is aware of an IP address associated with a given MAC address. This is used in proxy ARP scenarios in which a remote PE will respond to an ARP request received from a CE attached to that PE. An MPLS Label 1 field 480 is a downstream-assigned Label associated with the MAC address being advertised by a PE. This label is used to forward packets toward the CE.

RFC 7432 specifies four label assignment mechanisms. In a MAC-VRF assignment mechanism, a single EVPN label is used for all MAC addresses in a given MAC-VRF. In a MAC-VRF, Ethernet tag assignment mechanism, a unique EVPN label per <MAC-VRF, Ethernet tag> combination is used. In an ESI, Ethernet tag assignment mechanism, a unique EVPN label per <ESI, Ethernet tag> combination is used. Finally, in a MAC assignment mechanism, a unique EVPN label per MAC address is used.

§ 1.2.3 Core Isolation and Potential Problems when Core Isolation is Enabled

Referring to FIG. 5 (which corresponds to FIG. 1 of the document, "Understanding When to Disable EVPN-VXLAN Core Isolation" (Juniper Networks, Sep. 22, 2022), downloaded from https://www.juniper.net/documentation/ us/en/software/junos/evpn-vxlan/topics/concept/evpn-vxlan-core-isolation-disabling.html), by default, spine and leaf devices in an EVPN network implement the core isolation feature. If one of these devices loses all of its EVPN BGP peering sessions, the core isolation feature, working in conjunction with Link Aggregation Control Protocol (LACP), automatically brings down all Layer 2 Ethernet Segment Identifier (ESI) link aggregation group (LAG) interfaces on the device. The detection of a device losing all of its EVPN BGP peering sessions may be referred to as "core isolation detection" in this application. The act of bringing down all L2 MHES (e.g., ESI-LAG) interfaces on the device may be referred to as "core isolation action" in this application.

In some situations, the core isolation feature produces a favorable outcome. However, in other situations, the core isolation feature produces an undesired outcome. Consider, for example, the topology of FIG. 5, assuming core-isolation is enabled. FIG. 5 displays a topology in which two switches (e.g., QFX10000 switches available from Juniper Networks of Sunnyvale, CA) act as spine devices that form an EVPN-VXLAN core. In this topology, six switches (e.g., QFX5110 switches from Juniper Networks of Sunnyvale, CA) that act as leaf devices are multihomed in active-active mode to the spine devices, and in turn, each server is multihomed through ESI-LAG interfaces to two leaf devices. If the links between Leaf 1 and the two spine devices go down (as indicated by the dashed lines in FIG. 5), the BGP peering sessions established over the links also go down. With the core isolation (detection and action) feature enabled by default, LACP sets the server-facing interface on Leaf 1 to standby mode (also indicated by a dashed line in FIG. 5), which blocks all traffic from server 1. In this situation, the default implementation of the core isolation feature provides the following benefits. First, with the links from Leaf 1 to both spine devices down, it does not make sense for server 1 to continue forwarding traffic to Leaf 1. Second, traffic from server 1 is diverted to Leaf 2 until the links between Leaf 1 and the two spine devices are up again.

FIGS. 6A and 6B (which correspond to FIG. 2 of the document, "Understanding When to Disable EVPN-VXLAN Core Isolation" (Juniper Networks, Sep. 22, 2022), downloaded from https://www.juniper.net/documentation/us/en/software/junos/evpn-vxlan/topics/concept/evpn-vxlan-core-isolation-disabling.html) illustrate an example in which core isolation should be disabled. The topology shown in FIGS. 6A and 6B is migrating from multi-chassis link aggregation group (MC-LAG) and VirtualChassis environments to an EVPN-VXLAN environment. In this topology, the only EVPN-VXLAN components are two switches (e.g., QFX10000 switches from Juniper Networks of Sunnyvale, CA) that act as spine devices. The switches (e.g., QFX5110 switches from Juniper Networks of Sunnyvale, CA) that act as leaf (MC-LAG and Virtual Chassis) devices are multi homed in active-active mode through ESI-LAG interfaces to the spine devices.

If the link between Spine 0 and Spine 1 goes down, the last established BGP peering session also goes down (as indicated by dashed lines in FIGS. 6A and 6B). With the core isolation feature enabled by default, LACP sets the leaf-facing interfaces on Spines 0 and 1 to standby mode, which causes data traffic to and from both leaf devices to be dropped. With the core isolation feature implemented at the leaf device level, traffic within the datacenter would essentially be halted, which is an undesired outcome.

In cases like this, one can configure no-core-isolation at the [edit protocols evpn] configuration hierarchy level on each spine device to disable the core isolation feature. (See the AFTER illustration in FIG. 6B.) In this particular example, this statement is available only at the global level, so it applies to either all EVPN routing instances or the default switch instance on devices that don't have multiple routing instances.

As yet another example, consider the topology of FIG. 7. In FIG. 7, leaf 1 and leaf 2 can get isolated from one another when (a) a core facing interface goes down, (b) a core facing line card goes down, and/or (c) a device is rebooted. Still referring to FIG. 7, when the BGP session between leaf 1 and leaf 2 goes down, the "attachment circuit" (referred to as "AC") is brought down. This behavior is not ideal in ESI-LAG as there are only two leaf devices and the AC is brought down on both leaf devices. This causes a total loss of connectivity for hosts behind the ESI-LAG(s).

In view of the foregoing problem, similar to the example in FIGS. 6A and 6B, one current solution is to disable the core-isolation feature in ESI-LAG deployments. However, as discussed in § 1.2.4 below, this current solution has its own potential problem(s).

§ 1.2.4 Potential Problems when Disabling Core Isolation

Fortunately, the situation(s) discussed in § 1.2.3 above can be avoided by disabling the core isolation feature. Unfortunately, however, disabling core isolation can lead to other potential problems. For example, still referring to FIG. 7, if the core-isolation feature is disabled, when the BGP session is DOWN but both leaf devices (leaf 1 and leaf 2) are UP, the AC on each of the leaf devices remain UP (because core isolation is disabled). This can lead to what is known as a "split brain" scenario. More specifically, in this state, L3 traffic can fail as ARP request(s) sent by one leaf device can result in the corresponding ARP reply(s) being received on another leaf device (because on the CE device, both member links of the LAG are UP).

Further, when the ESI-LAG physical link is brought UP (e.g., when an EVPN session comes up after being DOWN), the leaf device that did not receive the ARP reply(s) might not be fully ready to forward the traffic. At scale, the routes may still be getting programmed (in the packet forwarding engine (PFE) of the leaf device) when the AC comes UP, leading to momentary traffic loss. If the AC is brought UP (i.e., member interface is brought UP or bundled in the aggregated Ethernet (AE) interface) sooner than the time required to program all the routes (e.g., MAC Routes, ARP/ND-Dest routes, Multicast Routes, etc.), the hosts will load balance the traffic to the new link. This traffic either gets flooded (in case of L2 packets) or triggers costly re-ARP (in case of L3, Multicast packets), in which case, L3/Multicast traffic may get dropped. This is a strange case in which the link is coming UP can lead to a traffic loss in the network.

In view of the foregoing, it would be useful to avoid potential problems of core isolation in a way that also avoids the potential "split brain" problems.

§ 2. SUMMARY

In example embodiments consistent with the present description, the potential problems associated with enabling or disabling core isolation is solved by providing a computer-implemented method for use in an EVPN including a first EVPN provider edge (PE) device and a second EVPN PE device, wherein each of the first and second EVPN PE devices is configured to have at least one peering session to share, directly or indirectly, routing information with each other and/or with any other EVPN PE device in the EVPN, and wherein the first EVPN PE device has a first attachment circuit (AC) and the second EVPN peer device has a second AC to a first multi-homed Ethernet segment (MHES) having an Ethernet Segment Identifier ESI. The computer-implemented method includes: (a) defining the first AC as "designated active" and the second AC as not "designated active" such that only the first AC is "designated active" for the MHES; (b) configuring the first EVPN PE device such that, responsive to a determination that each of its at least one peering session is down whereby the first EVPN PE device is unable to share routing information with any other EVPN PE device (also referred to as, "core isolation detection" in this application) in the EVPN, the first AC is allowed to remain UP because the first AC is "designated active"; (c) configuring the second EVPN PE device such that, responsive to core isolation detection, the second AC is brought into a STANDBY or DOWN state because the second AC is not "designated active"; and (d) responsive to a determination that some or all of at least one peering session of the second EVPN peer device transitions from down to up, whereby the second EVPN PE device becomes able to share routing information with any other EVPN PE device in the EVPN after having not been able to share routing information with any other EVPN PE device of the EVPN, (1) determining if routing information in the second EVPN PE device matches, to a predetermined degree, routing information in the first EVPN PE device, and (2) responsive to a determination that the routing information in the second EVPN PE device matches, to the predetermined degree, the routing information in the first EVPN PE device, bringing the not "designated active" second AC UP, and otherwise, responsive to a determination that the routing information in the second EVPN PE device does not match, to the predetermined degree, the routing information in the first EVPN PE device, leaving the not "designated active" second AC DOWN or in STANDBY.

Devices (such as a router for example) for performing this method are also described.

A non-transitory computer-readable medium storing processor-executable instructions for causing at least one processor to perform this method is also described.

§ 3. BRIEF DESCRIPTION OF THE DRAWINGS

FIGS. 2A-2C illustrate an example EVPN-VXLAN packet header format that may be used to encapsulate an Ethernet frame, as well as an MPLS header.

FIGS. 16A and 16B is an example of operations of the example architecture of FIG. 15.

§ 4. DETAILED DESCRIPTION

Figure 1:
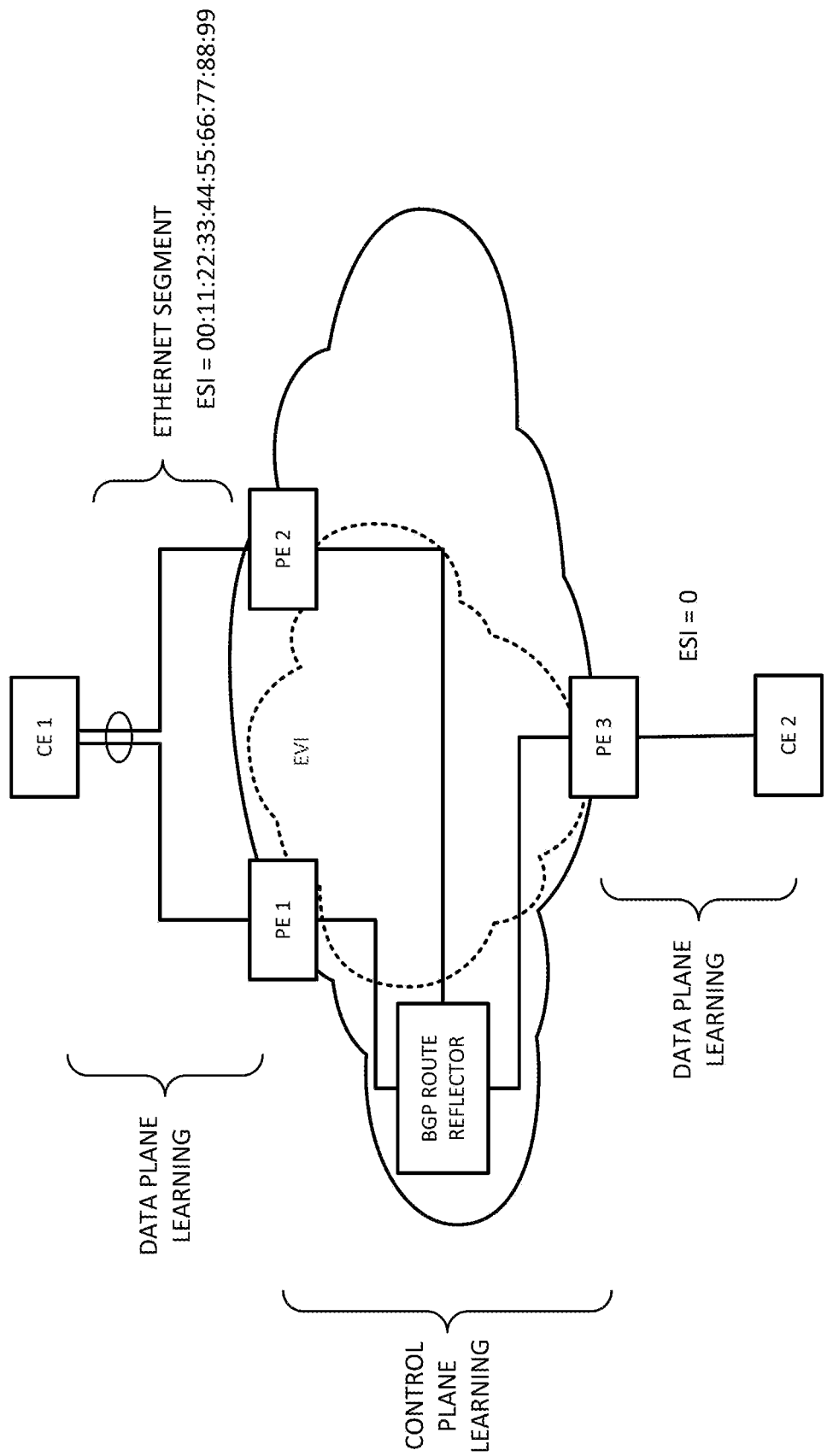
FIG. 1 is an example network topology used to provide an overview of Ethernet virtual private networks (EVPNs)
Figure 3:
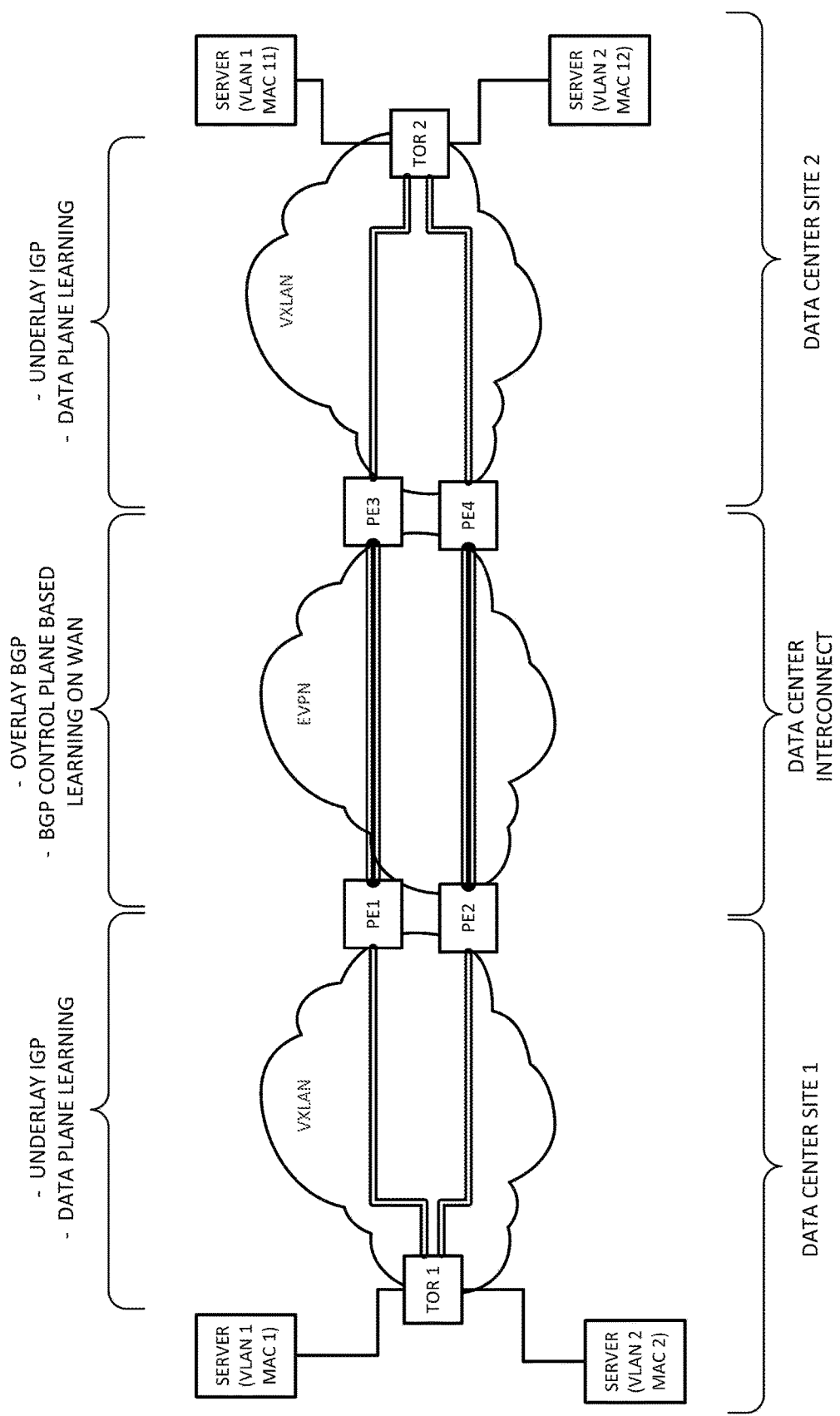
FIG. 3 is an example network topology used to provide an overview of EVPN-VXLAN integration.
Figure 4:
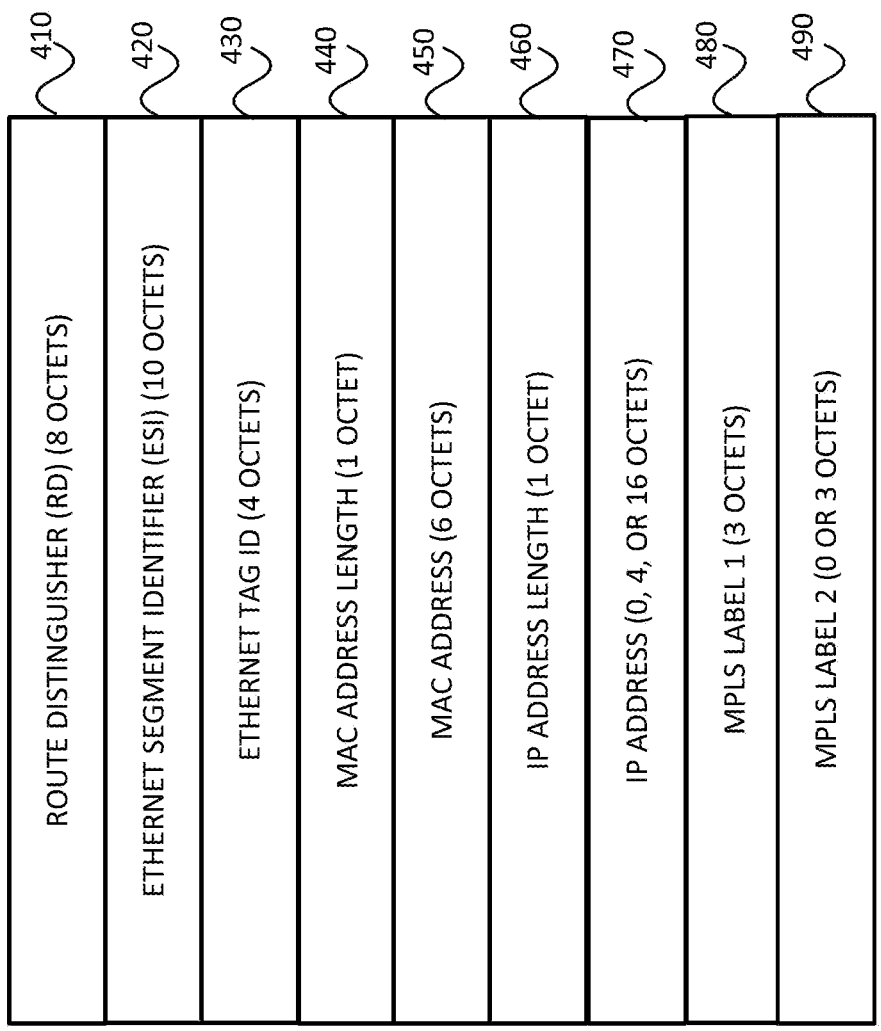
FIG. 4 illustrates an example data structure consistent with a Type 2 route format.
Figure 5:
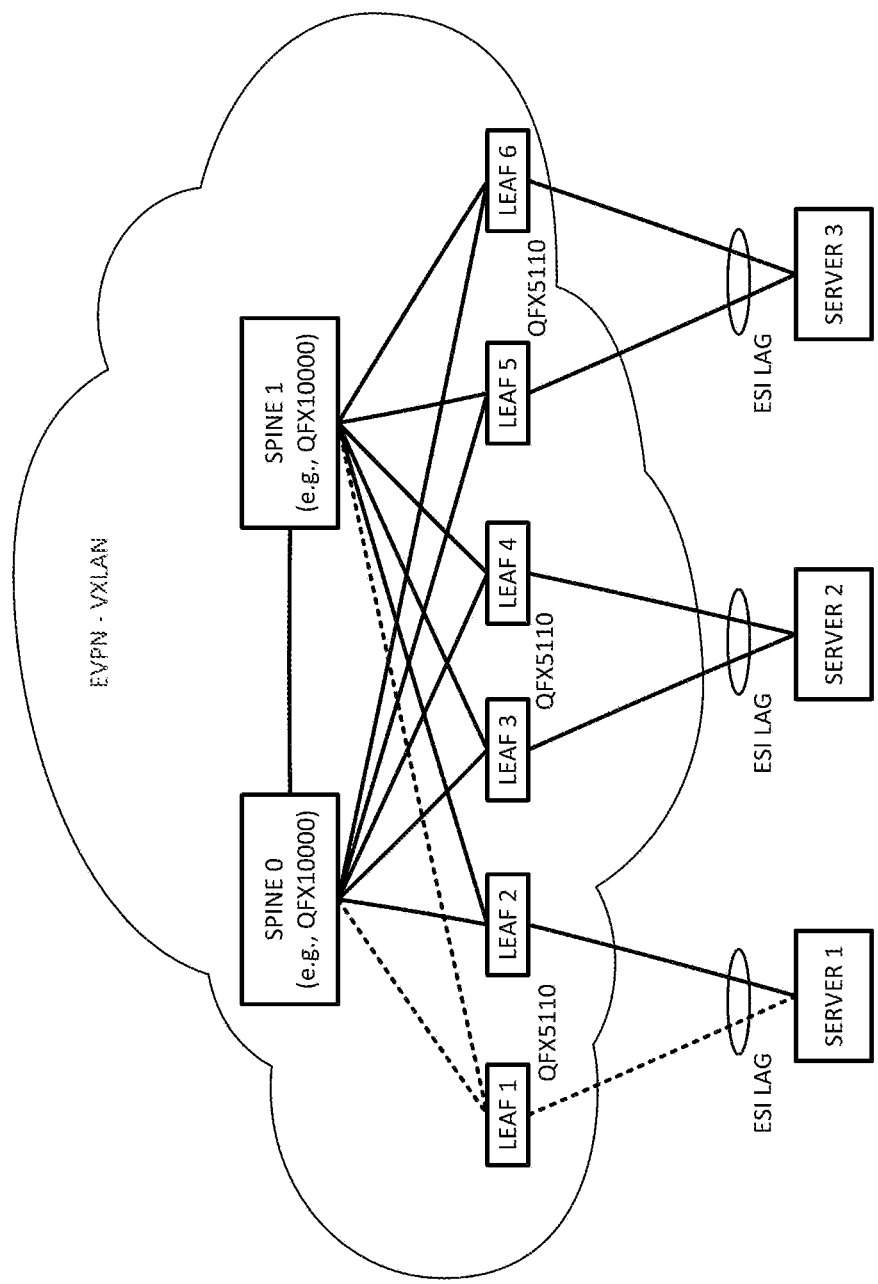
FIG. 5 is an example topology which illustrates benefits of core isolation and/or problems that might be caused by core isolation.

The present disclosure may involve novel methods, apparatus, message formats, and/or data structures for allowing core isolation action to be disabled, while also avoiding a "split brain" condition. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Acronyms and Terms

ES: Ethernet Segment
ESI: Ethernet Segment Identifier
MHES: Multi-Homed Ethernet Segment
NVE: Network Virtualized Edge
OAM: Operations, Administration, and Management
VM: Virtual Machine.

VNI: VXLAN Network Identifier (or VXLAN Segment ID)

VXLAN: Virtual eXtensible Local Area Network.

"Core Isolation Detection": The detection of a device losing all of its EVPN routing information sharing (e.g., BGP) peering sessions. (See, for example, the XX of the first EVPN PE device in FIG. 8A.)

"Core Isolation Action": The act of bringing down all L2 MHES attachment circuits (ACs) on a device that detected core isolation.

"End System": Could be Tenant VM, Host, Bridge etc.— System whose data is expected to go over Overlay Segment.

"Echo Request": Throughout this document, Echo Request packet is expected to be transmitted by Originator Overlay End Point and destined to Overlay Terminating End Point.

"Echo Reply": Throughout this document, Echo Reply packet is expected to be transmitted by Terminating Overlay End Point and destined to Overlay Originating End Point.

"Originating End Point": Overlay Segment's Head End or Starting Point of Overlay Tunnel.

"Share routing information" means to transmit routing information and/or receive routing information, such as via BGP updates.

"Terminating End Point": Overlay Segment's Tail End or Terminating Point of Overlay Tunnel.

§ 4.2 Example Network Topology Environment

Figure 8A:
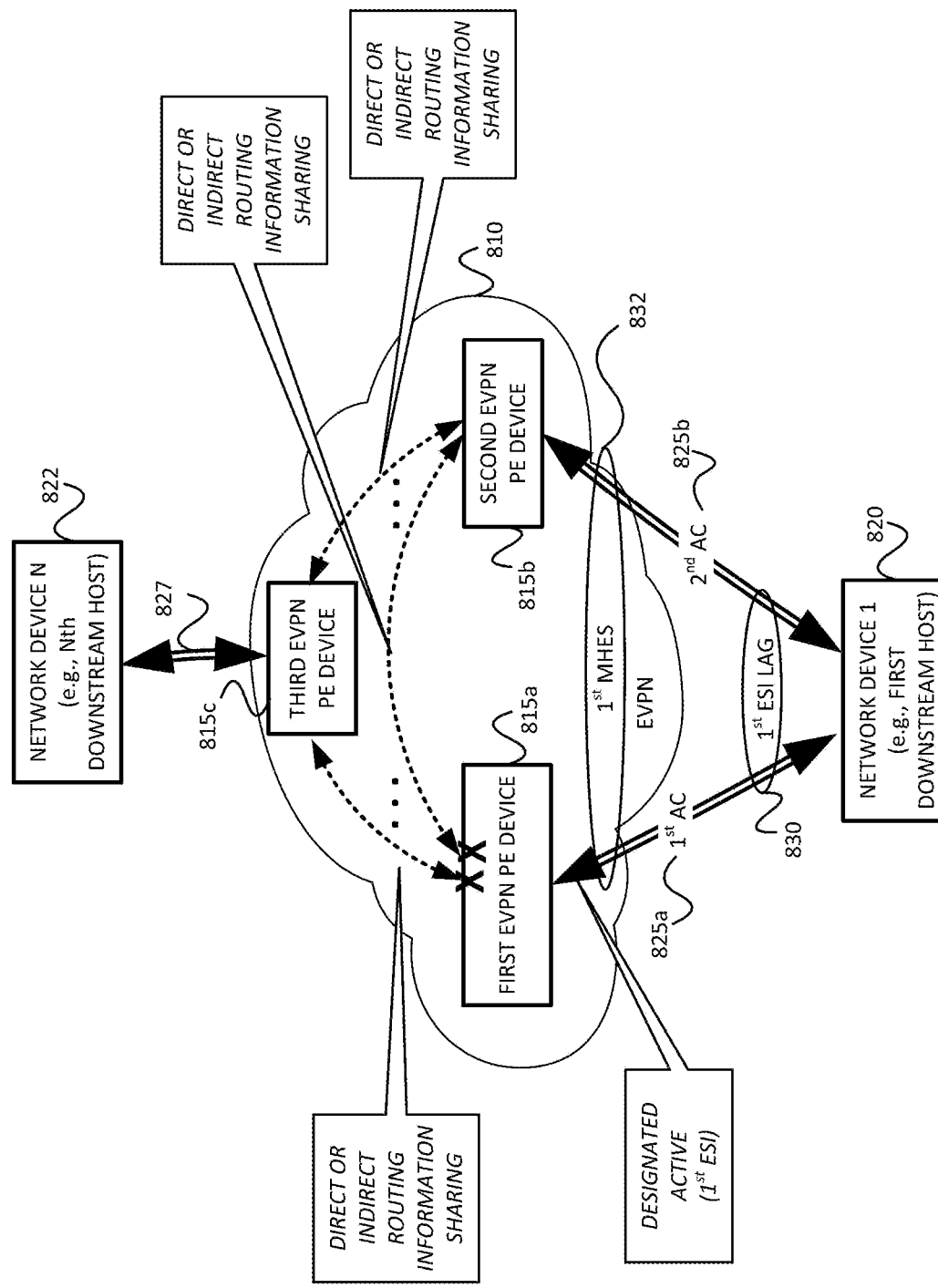
FIG. 8A illustrates a first generic network topology used to illustrates example embodiments consistent with the present description.

FIG. 8A illustrates a first generic network topology 800 used to illustrates example embodiments consistent with the present description. As shown, an EVPN 810 includes a first EVPN provider edge (PE) device 815a and a second EVPN PE device 815b. Under normal operating conditions, these EVPN PE devices 815a and 815b can share routing information. For example, the EVPN PE devices 815a and 815b may be iBGP peers and share routing information directly, via a BGP session. Alternatively, or in addition, the EVPN PE devices 815a and 815b may share routing information with each other indirectly, via a route reflector (not shown). First network device 820 is multi-homed to the EVPN 810 via a first attachment circuit (AC) 825a and a second AC 825b. The first and second ACs 825a and 825b belong to a given ESI-LAG 830. Note that each of the first and second ACs 825a and 825b may include one or more physical links. Note further that one (and only one) of the first and second ACs 825a and 825b is defined (e.g., via manual configuration, auto-election, etc.) as "designated active," while the other AC(s) is not "designated active."

In some example implementations, the EVPN 810 may be a VXLAN, and the first and second EVPN PE devices 815a and 815b may be endpoints of a VXLAN tunnel (also referred to as "VTEPs" or "Virtual Tunnel End Points").

Figure 6A:
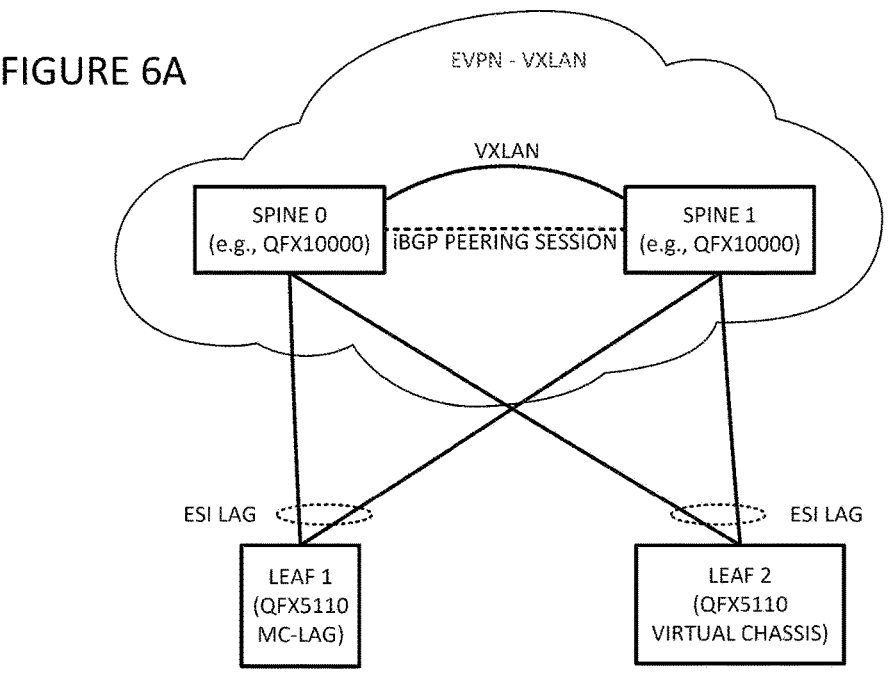
FIGS. 6A and 6B illustrate an example topology in which core isolation should be disabled.
Figure 6B:
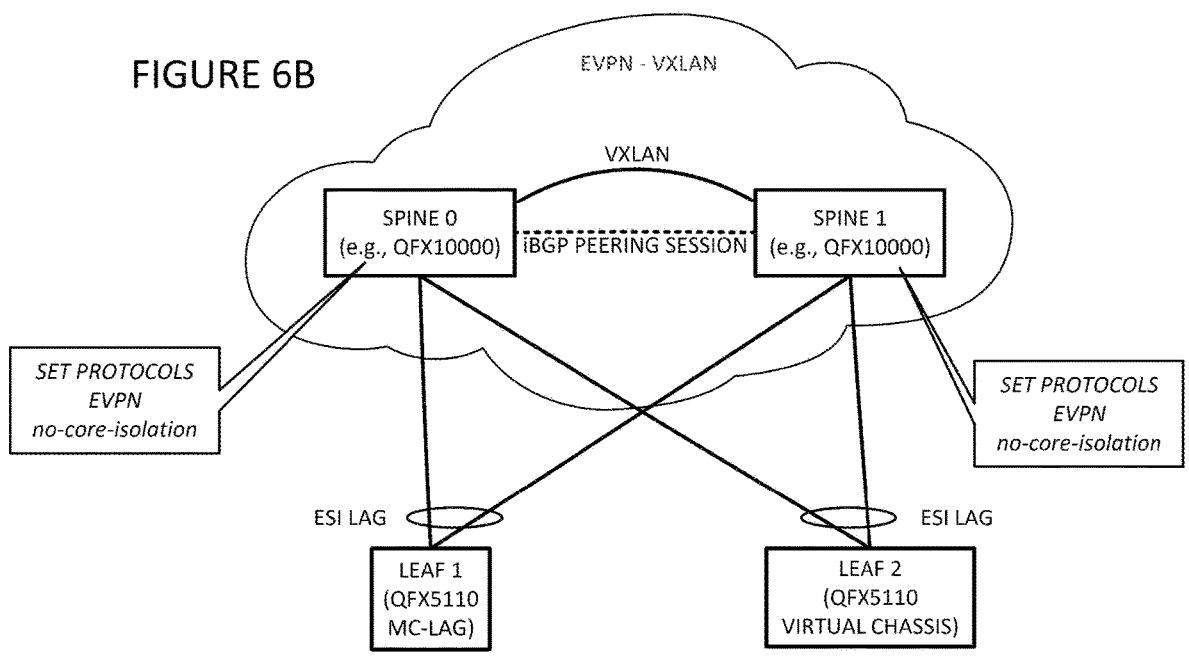
Figure 7:
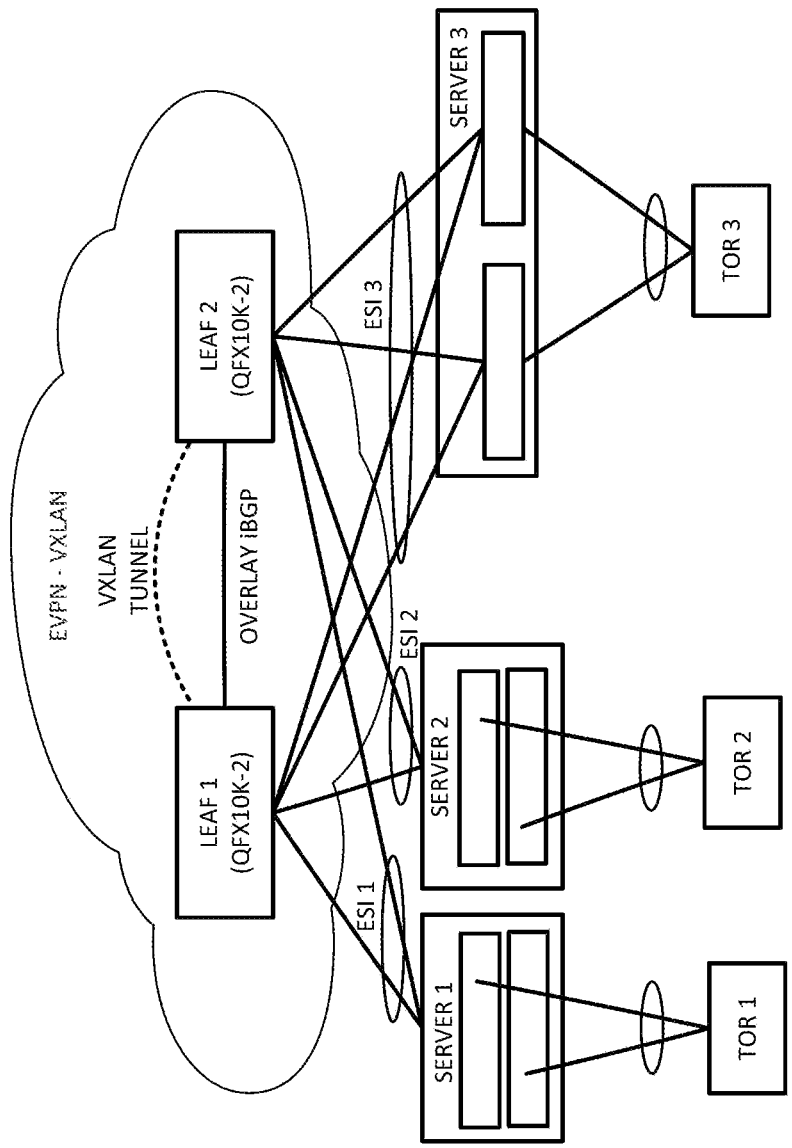
FIG. 7 illustrates yet another example topology which illustrates benefits of core isolation and/or problems that might be caused by core isolation.

In some example implementations, the first and second EVPN PE devices 815a and 815b are leaf nodes of a Clos network, and the first network device 820 is a top-of-rack (TOR) device. (Recall, for example, FIG. 7.) In some alternative example implementations, the first and second EVPN PE devices 815a and 815b are spine nodes of a Clos network, and the first network device 820 is a leaf node in the Clos network. (Recall, for example, FIGS. 6A and 6B.)

In some example implementations, the first network device 820 is a customer edge (CE) device.

Figure 8B:
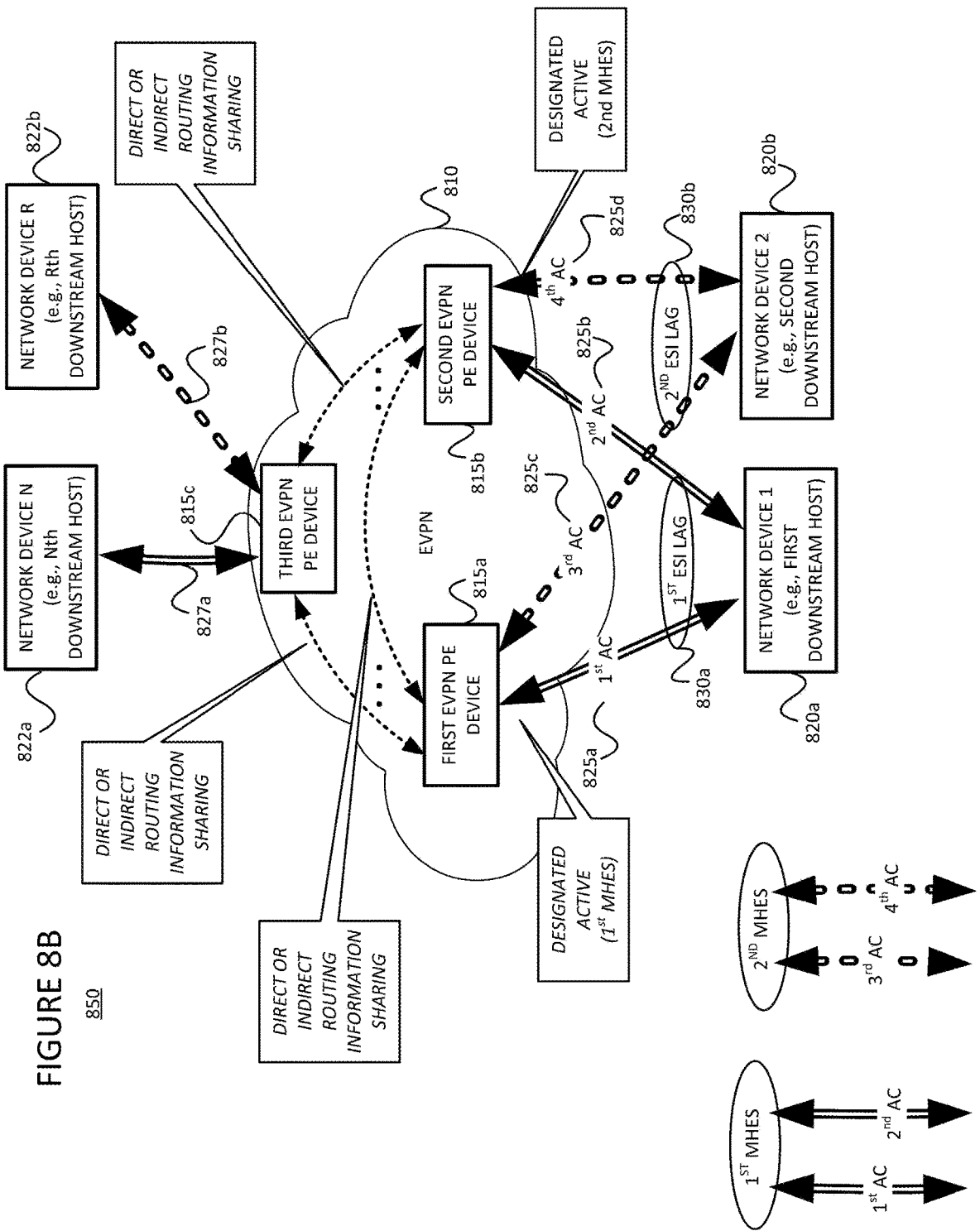
FIG. 8B illustrates a second generic network topology extended from the first generic topology.

FIG. 8B illustrates a second generic network topology 850 extended from the first generic topology. This is similar to the first generic network topology 800, but a second network device 820b is added. Further, the second network device 820b is multi-homed to the EVPN 810 via a third AC 825c and a fourth AC 825d. The third and fourth ACs 825c and 825d belong to another ESI-LAG 830b. Note that each of the third and fourth ACs 825c and 825d may include one or more physical links. Note further that one (and only one) of the third and fourth ACs 825c and 825d is defined (e.g., via manual configuration, auto-election, etc.) as "designated active," while the other AC(s) is not "designated active." Therefore, in the example second generic network topology 850, each of the first MHES 832 (including the first and second ACs) and a second MHES (not labeled, but including the third and fourth ACs) has one (and only one) "designated active" AC. Specific examples of the second generic network topology 850 correspond to those above with reference to the first generic network topology 800.

Having introduced first and second generic network topologies 800 and 850, example methods consistent with the present description, which may be used in the context of these example network topologies, are described in § 4.3 below.

§ 4.3 Example Method(s)

Figure 9:
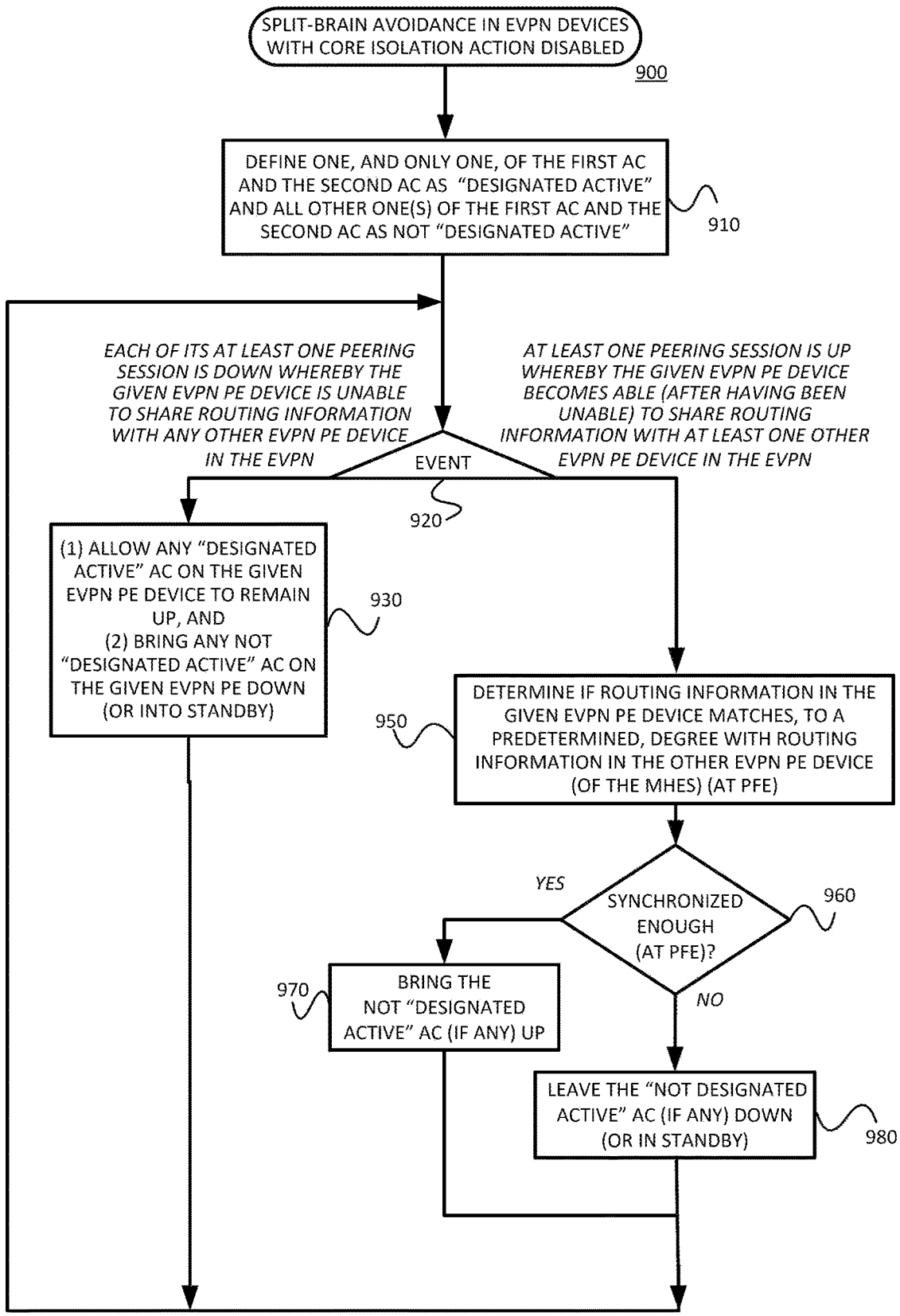
FIG. 9 is a flow diagram of a first example method consistent with the present description.

FIG. 9 is a flow diagram of a first example method 900 consistent with the present description. Referring back to FIG. 8A, the example method 900 may be used in a system including a first EVPN PE device 815a and a second EVPN PE device 815b. Each of the first and second EVPN PE devices 815a and 815b is configured to have at least one peering session to share, directly or indirectly, routing information with each other and with any other EVPN PE device in the EVPN (such as, for example, third EVPN PE device 815c in FIGS. 8A and 8B). The first EVPN PE device 815a has a first attachment circuit (AC) 825a and the second EVPN peer device 815b has a second AC 825b, both the first and second ACs 825a and 825b belonging to a first multi-homed Ethernet segment (MHES) having an Ethernet Segment Identifier ESI). As shown, the example method 900 defines one and only one of the first AC and the second AC as "designated active" and the other of the first AC and the second AC as not "designated active" such that only one AC is "designated active" for the MHES. (Block 910) In the example of FIG. 8A, the first AC 825a is "designated active" and the second AC 825b is not "designated active". Note that 920-990, described below, can be performed by each of the first and second EVPN PE devices 815a and 815b.

As shown by event branch point 920, different branches of the example method 900 are performed responsive to different events. For example, responsive to a determination by a given EVPN PE device that each of its at least one peering session(s) is down whereby the given EVPN PE device is unable to share routing information with any other EVPN PE device in the EVPN (also referred to as "core isolation detection" in this application), any "designated active" AC is allowed to remain UP, and any not "designated active" AC it is brought into a STANDBY or DOWN state. (Block 930) The example method 900 then branches back to event branch point 920.

Still referring to event branch point 920, responsive to a determination that one, or some, or all of at least one peering session of the EVPN peer device transitions from down to up, whereby the EVPN PE device becomes able to share routing information with any other EVPN PE device in the EVPN after having not been able to share routing information with any other EVPN PE device of the EVPN, the example method 900 performs a number of acts. More specifically, the method 900 determines if routing information in the EVPN PE device matches, to a predetermined degree, routing information in the other EVPN PE device. (Block 950) Responsive to a determination that the routing information in the EVPN PE device matches, to the predetermined degree, the routing information in the other EVPN PE device (Decision 960=YES), any not "designated active" AC(s) is brought UP. (Block 970) Otherwise, responsive to a determination that the routing information in the EVPN PE device does not match, to the predetermined degree, the routing information in the other EVPN PE device, any not "designated active" AC(s) is left DOWN or in STANDBY. (Block 980) The example method 900 then branches back to event branch point 920.

As should be appreciated from the foregoing, the example method 900 allows core isolation action to be disabled, while still avoiding a "split brain" condition. Note that certain steps of the example method can be reordered, and/or avoided in the presence or absence of certain conditions(s), without departing from the present invention. As one example, if, for a given MHES, an EVPN PE device has no not "designated active" AC, steps 950, 960, 970 and 980 can be avoided for that MHES. Further, although not required, in some example implementations, blocks 950, 970, 980 and decision 960 can be performed for each of a plurality of MHESes. In such example implementations, block 950 may determine if routing information for the given MHES in the given EVPN PE device is synchronized, to a predetermined degree, with routing information for the given MHES in the other EVPN device of the MHES.

Referring back to block 910, in some example implementations of the example method 900, one of the first AC and the second AC may be configured as "designated active" manually, for example, via a router's command line interface (CLI). In other example implementations of the example method 900, one of the first AC and the second AC may be determined as "designated active" automatically using a predetermined election procedure.

Referring back to block 930, in some example implementations of the example method 900, the "designated active" AC may be allowed to remain UP by disabling "core isolation action" in the EVPN PE device having the "designated active" AC (for example, the first EVPN PE 815a in FIG. 8A).

Referring back to block 950, in some example implementations of the example method 900, the act of determining if routing information in the one EVPN PE device matches, to a predetermined degree, with routing information in the other EVPN PE device uses CE-IP ping (e.g., request and reply) messages between the first EVPN PE device and the second EVPN PE device to share route metrics. Details of such example implementations are described in § 4.5.3.1 below. These example implementations permit checking information in the respective packet forwarding engines (PFEs) of the EVPN PE devices. In other example implementations of the example method 900, the act of determining if routing information in one EVPN PE device matches, to a predetermined degree, with routing information in the other EVPN PE device may be based on the presence or absence of a BGP End-of-RIB marker. Details of such example implementations are described in § 4.5.3.2 below.

Referring to both FIGS. 8B and 9, in embodiments with more than one MHES, the outcome and/or performance of each of acts 950, 960, 970 and 980 will depend on whether the AC on the EVPN PE device 815a, 815b is the designated active AC for the given MHES.. In the example of FIG. 8B, the first AC is the "designated active" AC for the first MHES 832 (including first and second ACs), and the fourth AC is the "designated active" AC for the second MHES (not labeled, but including the third and fourth ACs). However, the invention is not limited to this configuration. For example, either of the first and second ACs could be "designated active" for the first MHES, and either of the third and fourth ACs could be "designated active" for the second MHES, provided that there is one and only one "designated active" AC per MHES. That is, referring back to block 910, for each MHES, one and only one AC is defined as "designated active" for the given MHES.

§ 4.4 Example of Operations in Example Implementation

Referring to FIG. 8B, assume that the first and second EVPN PE devices 815a and 815b are configured (e.g., manually, via a CLI interface) so that the first AC 825a is "designated active" for the first MHES and the fourth AC 825d is "designated active" for the second MHES. (Recall, e.g., block 910 of FIG. 9.)

Consider the first EVPN PE device 815a. Assume that it has determined that each of its at least one peering session(s) is down whereby the first EVPN PE device 815a is unable to share routing information with any other EVPN PE device in the EVPN. In response to this determination, the first AC 825a, which is "designated active" for the first MHES, is allowed to remain UP, and the third AC 825c, which is not "designated active" for the second MHES, is brought into a STANDBY or DOWN state. (Recall, e.g., block 930 of FIG. 9.)

Assume that at a later time, the first EVPN PE device 815a determines that one, or some, or all of at least one peering session of the EVPN peer device transitions from down to up, whereby the first EVPN PE device 815a becomes able to share routing information with any other EVPN PE device in the EVPN after having not been able to share routing information with any other EVPN PE device of the EVPN. In response to this determination, the first EVPN PE device 815a determines if its routing information matches, to a predetermined degree, routing information in the second EVPN PE device 815b. (Recall, e.g., block 950 of FIG. 9.) If yes, any not "designated active" AC(s) for the given MHES is brought UP. (Recall, e.g., block 970 of FIG. 9.) For the first EVPN PE device 815a, for the first MHES, it has no not "designated active" AC. For the second MHES, the first EVPN PE 815 has the third AC 825c as not "designated active, so the third AC 825c can be brought UP. If the routing information does not match to the predetermined degree, any not "designated active" AC(s) is left DOWN or in STANDBY. (Recall, e.g., block 980 of FIG. 9.)

Now consider the second EVPN PE device 815b. Assume that it has determined that each of its at least one peering session(s) is down whereby the second EVPN PE device 815b is unable to share routing information with any other EVPN PE device in the EVPN. In response to this determination, the fourth AC 825d, which is "designated active" for the second MHES, is allowed to remain UP, and the second AC 825b, which is not "designated active" for the first MHES, is brought into a STANDBY or DOWN state. (Recall, e.g., block 930 of FIG. 9.)

Assume that at a later time, the second EVPN PE device 815b determines that one, or some, or all of at least one peering session of the EVPN peer device transitions from down to up, whereby the second EVPN PE device 815b becomes able to share routing information with any other EVPN PE device in the EVPN after having not been able to share routing information with any other EVPN PE device of the EVPN. In response to this determination, the second EVPN PE device 815b determines if its routing information, to a predetermined degree, routing information in the first EVPN PE device 815a. (Recall, e.g., block 950 of FIG. 9.) If yes, any not "designated active" AC(s) for the given MHES is brought UP. (Recall, e.g., block 970 of FIG. 9.) For the second EVPN PE device 815b, for the first MHES, it has the second AC 825b as not "designated active," so the second AC 825b can be brought UP." For the second MHES, the second EVPN PE 815 has no AC as not "designated active." If the routing information does not match to the predetermined degree, any not "designated active" AC(s) is left DOWN or in STANDBY. (Recall, e.g., block 980 of FIG. 9.)

As should be appreciated from the foregoing, the example method 900 allows core isolation action to be disabled, while still avoiding a "split brain" condition. More specifically, when the first and second EVPN PE devices 815a and 815b become unable to share routing information with the other EVPN PEs, for the first MHES, the first network device 820a will communicate only with the first PE device 815a, but not with the second PE device 815b. For the second MHES, the second network device 820b will communicate only with the second PE device 815b, but not with the first PE device 815a. For each MHES, these network devices 820a and 820b will only become multi-homed to both the first and second EVPN PE devices 815a and 815b when the routing information of the first and second EVPN PE devices 815a and 815b match to a predetermined degree. In this way, the network devices 820 remain connected to the EVPN 810 without the potential problem of a "split brain" between the first and second EVPN PE devices 815a and 815b.

§ 4.5 Refinements, Alternatives, and/or Extensions

§ 4.5.1 Evpn Mhes Peer Liveness Detection

Referring back to event branch point 920 of FIG. 9, a router running the example method 900 will be able to detect whether it is able or unable to share routing information (e.g., directly or indirectly, via a RR) with other PE(s) in the EVPN. To detect if a peer is alive, periodic keepalive packets may be exchanged between peers over a management network. The management network is preferably an alternative network to the data network because a peer might still be up and running even if the data network is down (leading to split brain scenario).

In ESI-LAG, peer protocol and keepalive are by configuration. For example, the backup-liveness detection command described in the "Multichassis Link Aggregation User Guide for Routing and Switching Devices" (Aug. 31, 2022, Juniper Networks of Sunnyvale, CA) downloaded from https://www.juniper.net/documentation/us/en/software/junos/mc-lag/index.html (incorporated herein by reference) states that this command is used to determine whether a peer is up or down by exchanging keepalive messages over the management link between the two Inter-Chassis Control Protocol (ICCP) peers. When an ICCP connection is operationally down, the status of the peers hosting a multi-chassis link aggregation group (MC-LAG) is detected by sending liveness detection requests to each other. Peers must respond to liveness detection requests within a specified amount of time. If the responses are not received within that time for a given number of consecutive attempts, the liveness detection check fails, and a failure action is implemented. Backup liveness detection must be configured on both peers hosting the MC-LAG.

Further, referring back to block 910 of FIG. 9, to identify one (and only one per ESI-LAG) device on which the AC must be enabled (UP) in split brain scenario, one of devices will be configured as "designated-active." The following table illustrates what occurs in response to various states of the peer and of BGP.

| State | First EVPN PE device (designated-active) | Second EVPN PE device (not designated-active) | Comments |
| --- | --- | --- | --- |
| Peer Alive + BGP UP | AC is UP | AC is UP | Healthy Setup |
| Peer Alive + BGP Down | AC is UP | AC is Down | EVPN-Control is down. Brind AC down to avoid split-brain scenario |
| Peer Down + BGP UP | AC is UP | AC is UP | Peer not reachable through alternate network. No need to take any action as EVPN control plane is healthy. |
| Peer Down + BGP Down | AC is UP | AC is Down | Setup is down |

§ 4.5.2 Detecting Transition of Evpn BGP Session to UP

Existing "core-isolation determination" mechanism(s) may be used to determine if an EVPN peer is up.

§ 4.5.3 Ensuring Route "Synchronization" in Peer Devices

Referring back to block 960 of FIG. 9, in the example method 900, responsive to the first and second EVPN PE devices becoming able to share routing information, it is determined if routing information in the first EVPN PE device is synchronized to a predetermined degree with routing information in the second EVPN PE device. This may be thought of as detecting if all routes in the first and second EVPN PE devices match or converge to (at least to a predetermined degree).

There are various ways to determine (with varying degrees of accuracy) whether the routing information in the EVPN PE devices match (at least to a predetermined degree). Two such mechanisms for this purpose are described below. More specifically, a CE-Ping based method is described in § 4.5.3.1, and a BGP End-of-RIB marker based method is described in § 4.5.3.2.

Referring back to decision 960 and block 970 of FIG. 9, in the example method 900, once the match (at least to a predetermined degree) of routing information is confirmed (e.g., based on one of two alternative mechanisms described here), the AC of the not-designated-active EVPN PE device is brought UP.

§ 4.5.3.1 Ensuring Route "Synchronization" Using CE-IP Ping

CE-IP Ping can be used to exchange route metrics between EVPN MHES peers. When route metrics converge (at least to a predetermined degree), the AC of any not "designated active" EVPN PE device is enabled (e.g., brought to the UP state from a STANDBY or DOWN state). mechanism. For example, the IETF draft, "Generic Overlay OAM and Datapath Failure Detection," draft-jain-nvo3-overlay-oam-03 (Internet Engineering Task Force, Mar. 6, 2015) (referred to as "the Jain draft" and incorporated herein by reference) describes a mechanism that can be used to detect Data Path Failures of various overlay technologies as VXLAN, and verifying/sanity of their Control and Data Plane for given Overlay Segment.

VXLAN (RFC 7348, incorporated herein by reference) is a known technology and is used as tunneling mechanism to overlay either Layer 2 networks or Layer 3 networks on top of Layer 3 Underlay networks. For the VXLAN overlay models, there are two Tunnel End Points for a given Overlay Segment. One End Point is where the Overlay Originates, and other where Overlay Terminates. In most cases the Tunnel End Point is intended to be at the edge of the network, typically connecting an access switch to an IP transport network. The access switch could be a physical or a virtual switch located within the hypervisor on the server which is connected to End System which is a VM.

To facilitate verification of Overlay Segment or any End-System using the Overlay, the Jain draft proposes sending of a Packet (called an "Echo Request") along the same data path as other Packets belonging to this Segment. Echo Request also carries information about the Overlay Segment whose Data Path is to be verified. This Echo Request is forwarded just like any other End System Data Packet belonging to that Overlay Segment, as it contains the same Overlay Encapsulation as regular End System's data. On receiving Echo Request at the end of the Overlay Segment, it is sent to the Control Plane of the Terminating Overlay End Point, which in-turn would respond with Echo Reply.

As described in section 5 of the Jain draft, a Generic Overlay Echo Request/Reply is a UDP Packet identified by well-known UDP Port XXXX. The payload carried by Overlay typically could be either be Layer 2/Ethernet Frame, or it could be Layer 3/IP Packet. If the encapsulated payload carried by Overlay is of type Ethernet, then the OAM Echo Request packet would have inner Ethernet Header, followed by IP and UDP Header. (See, e.g., 1040, 1050, 1060 and 1070 of FIG. 10A.) The payload of inner UDP would be as described in the Jain draft. If the encapsulated payload carried by Overlay is of type IP, then the OAM Echo Request packet would have inner IP Header, followed by UDP Header. The payload of inner UDP would be as described in the Jain draft.

Section 5.3 of the Jain draft describes is the format of UDP payload of Generic Overlay OAM Packet. Section 5.3.1.1 describes TLVs for VXLAN Ping messages if the sender address is IPv4 (See FIG. 10B.) and if the sender address is IPv6 (See FIG. 10C.).

This step is activated only when one of following events occurs:

a) Core is isolated→Core is UP.
b) AC is down→AC is UP (AE interface towards CE device)

Figure 10A:
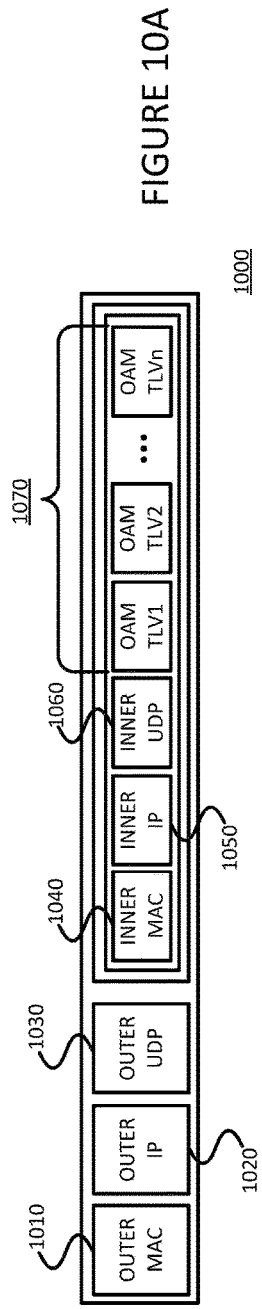
FIG. 10A is an example data structure for use in determining if routing information in one EVPN PE device matches, at least to a predetermined extent, routing information in another EVNP PE device.
Figure 10B:
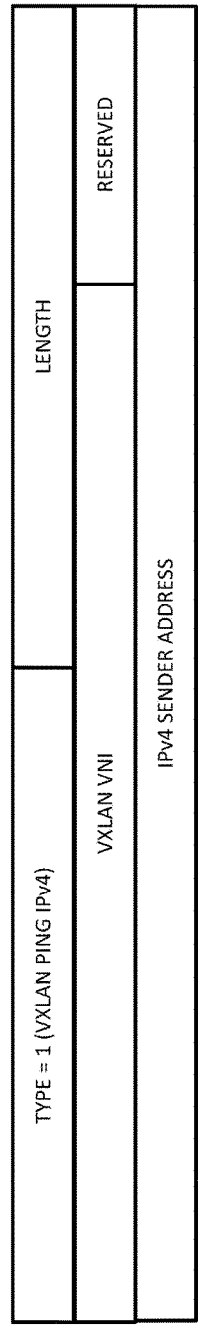
FIGS. 10B and 10C illustrate known TLVs for VXLAN ping, for IPv4 and IPv6, respectively.
Figure 10C:
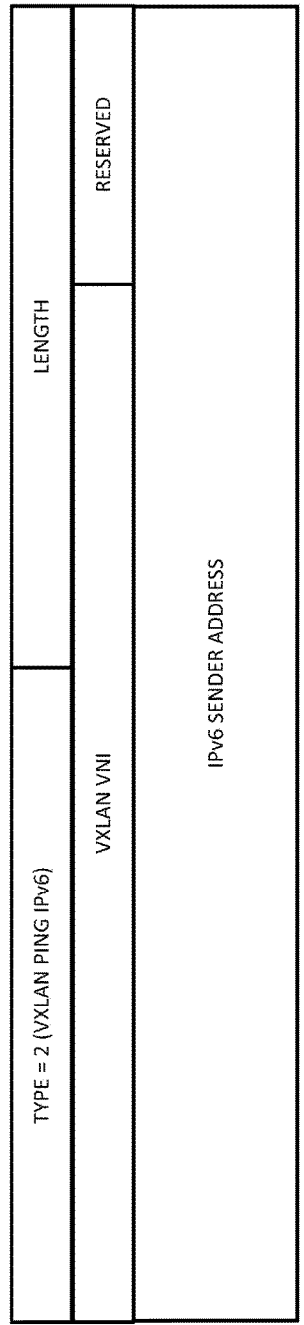
Figure 11:
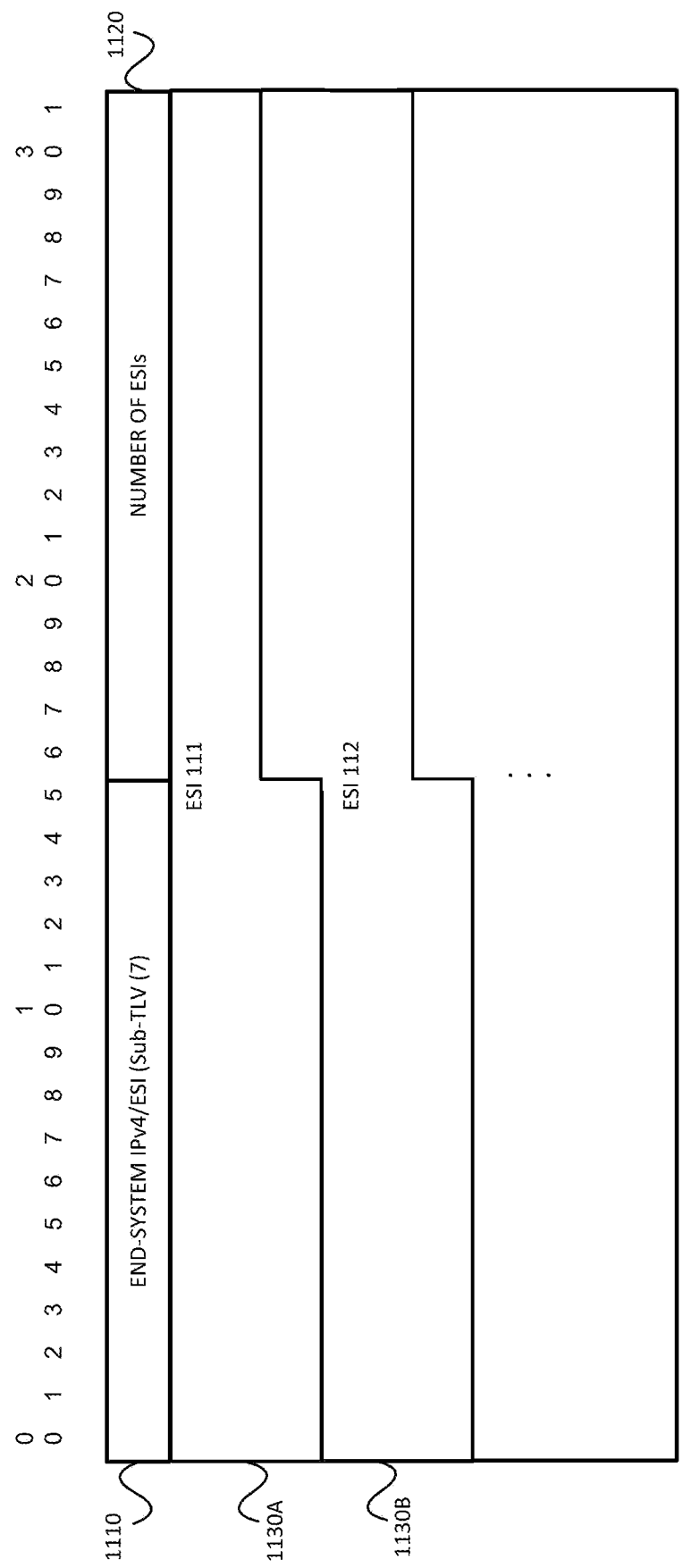
FIG. 11 is an example TLV data structure that may be included in the data structure of FIG. 10A.

FIG. 10A illustrates an example "overlay ping" packet 1000 with VNI '0' and Inner Dest-IP 1050 as 0.0.0.0. A Sub-TLV is added to identify the ESI. For example, FIG. 11 illustrates an example new TLV 1100, referred to as "OVERLAY_PING_SUBTLV_TYPE_ENDSYS_JUNIPER_ESI." As shown in FIG. 11, this new TLV 1100 includes an End-System IPv4/ESI Sub-TLV(7) field 1110, a field carrying data indicating a number of ESIs 1120, and one or more fields 1130 for carrying information about one or more ESIs. The example above sub-TLV 1100 of FIG. 11 may be sent as a part of Overlay-Ping Request packet (e.g., as defined in the Jain draft).

When the Peer device receives this ping packet (with VNI ID "0" and ESI TLV), it creates response packet(s) with one or more of the following information:

Number of IPV4 MAC-IP Entries on the ESI LAG (on all VNIs);
Number of IPV6 MAC-IP Entries on the ESI LAG (on all VNIs);
Number of MAC entries on the ESI LAG (on all VNIs); and/or
Multicast (MC) Route Information.

Figure 12:
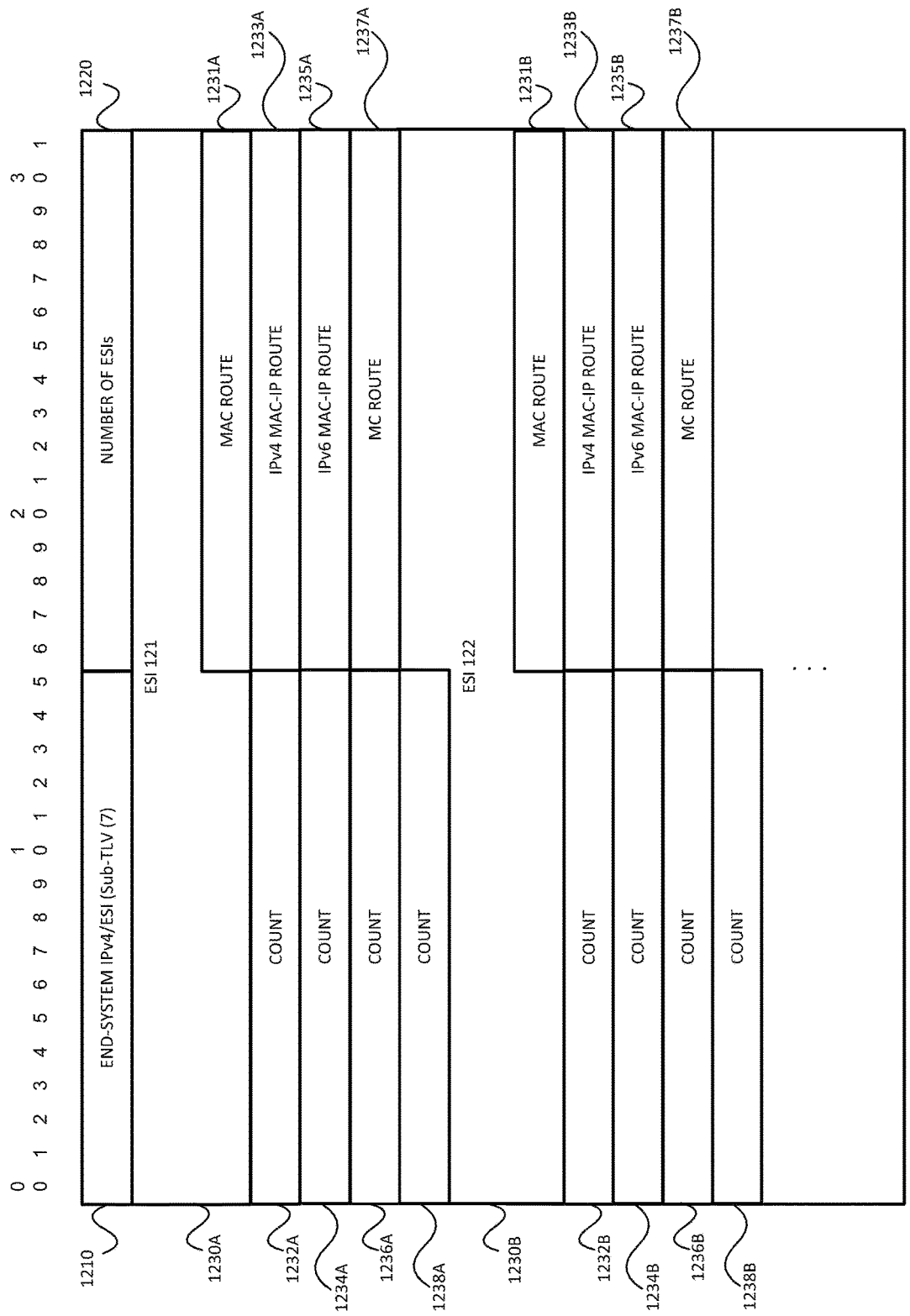
FIG. 12 is an example TLV data structure that may be included in the data structure of FIG. 10A.

FIG. 12 illustrates an example new TLV 1200, referred to as "OVERLAY_PING_SUBTLV_TYPE_ENDSYS_JUNIPER_RT_METRIC." As shown in FIG. 12, this new sub-TLV 1200 includes an End-System IPv4/RT MetricSubTLV field 1210, and a field carrying data indicating a number of ESIs 1220. For each of one or more ESIs, the sub-TLV 1200 includes a field 1231 indicating a count of MAC routes, a field 1233 indicating a count of IPv4 MAC-IP router, a field 1235 indicating a count of IPv6MAC-IP routes, and a field 1237 indicating a count of MC routes.

Responsive to receiving this Ping response, the initiator of the Ping request may bring up the number of MAC-IP entries and MAC count matches in its packet forwarding engine (PFE) AC. If some or all of the counts match (or are within a predetermined percentage, the AC is brought UP.

Note that the exchange of extended CE-IP Ping request and reply messages might be repeated a few times to converge to a steady state metric and enable the ESI-LAG. Alternatively, one can potentially use a percent watermark of the route metric received from peer to whether or not to bring up the AC.

As should be appreciated from the foregoing, the CE-IP ping reply message includes at least one of (e.g., one of, two of, three of, or all of) (A) a number of IPv4 MAC-IP entries on the ESI-LAG on all VNIs, (B) a number of IPv6 MAC-IP entries on the ESI-LAG on all VNIs, (C) a number of MAC entries on the ESI-LAG on all VNIs, and/or (D) multicast route information. In this case, referring back to block 960 of FIG. 9, in some implementations of the example method 900, the act of determining if routing information in the first EVPN PE device is synchronized to a predetermined degree with routing information in the second EVPN PE device includes determining whether each of the at least one of (e.g., one of, two of, three of, or all of) (A) a number of IPv4 MAC-IP entries on the ESI-LAG on all VNIs, (B) a number of IPv6 MAC-IP entries on the ESI-LAG on all VNIs, (C) a number of MAC entries on the ESI-LAG on all VNIs, and/or (D) multicast route information, is within a predetermined percent of the corresponding number in the one of the first and second EVPN PE device that initiated the CE-IP ping request.

Note that the above-described CE-Ping-based mechanism may require that the EVPN PE devices support the Jain draft CE Ping request and reply packets, as extended above.

In one alternative implementation, the sub-TLVs in FIGS. 11 and 12 may be carried in an initiating message. That is, the information for checking routing information match (at least to the predetermined degree) can be carried in a message other than a reply message.

In other alternative implementations, since the route information metrics are provided per MHES (e.g., per ESI), whether or not routing information in one PE device matches, to a predetermined degree, routing information in another PE device, may be performed on a per MHES basis. If, however, this is not done, the example TLV(s) and sub-TLV(s) of FIGS. 11 and 12 can be simplified to carry metrics (e.g., counts) for all MAC routes, for all IPv4 MAC-IP routes, for all IPv6 MAC-IP routes, and/or for all MC routes, regardless of MHES or ESI.

§ 4.5.3.2 Ensuring Route "Synchronization" Using BGP End-of-RIB Marker

Referring back to block 960 of FIG. 9, some implementations of the example method 900 may use a BGP End-of-RIB-based method to determine if routing information in the first EVPN PE device matches, at least to a predetermined degree, with routing information in the second EVPN PE device. For example, the first and second EVPN PE devices may be enabled with "graceful-restart" cli, which is an existing feature. In the case of EVPN PE devices from Juniper Networks of Sunnyvale, CA, the device's routing protocol daemon (RPD) will delay the "IFTLV_TYPE_CORE_ISOLATION_STATE_T" TLV until the End-Of-RIB Marker is received from its peer or routes are found to be synchronized (i.e., match to at least a predetermined degree) to the PFE/ASIC.

Note that LACPD bundles AC once the above-TLV is published by RPD. (This is an existing mechanism used in core isolation.) Note further that this BGP-based solution is RFC based. Based on the End-of-Rib Marker, implementation can check whether the routes are programmed in PFE/ASIC before enabling the AC.

§ 4.5.4 Example Network Topologies in which the Example Methods May be Used

Referring back to FIGS. 8A and 8B, in some cases, the first and second EVPN PE devices 815a and 815b are leaf nodes of a Clos network, and the first network device 820 (or first and second network devices 820a and 820b) is a top-of-rack (TOR) device. In some other cases, the first and second EVPN PE devices 815a and 815b are spine nodes of a Clos network, and the first network device 820 (or first and second network devices 820a and 820b) is a leaf node in the Clos network. Such topologies may be used in the context of data centers.

Still referring to FIGS. 8A and 8B, in some cases, the first and second EVPN PE devices 815a and 815b are provider edge (PE) devices, and the first network device 820 is (or first and second network devices 820a and 820b are) a customer edge (CE) device.

Still referring to FIGS. 8A and 8B, in some cases, each of the first and second EVPN PE devices 815a and 815b is an end point of a virtual tunnel in a VXLAN.

In some cases, the first and second EVPN PE devices 815a and 815b are iBGP peers (in which case, routing information can be shared directly, in a BGP session between them). In some other cases, each of the first and second EVPN PE devices 815a and 815b is an iBGP peer with a route reflector (RR) (in which case, routing information is shared indirectly, via the RR).

The methods and devices described is not limited to the specific topologies described. Rather, they can be applied to other network topologies.

§ 4.5.5 Additional Scenarios

In one scenario in which both devices are coming up, at least some example embodiments provide a solution that also entails identifying one of the leafs as "designated-active" knob. The AC will be enabled only on that Leaf that has the above knob set. The other leaf will have AC down till convergence.

In a another specific implementation in which there are multiple member links per ESI LAG, in at least some example embodiments, L2ALD will ensure that all L2ALM instances have routes before enabling LACP bundling.

§ 4.6 Example Apparatus

Figure 13:
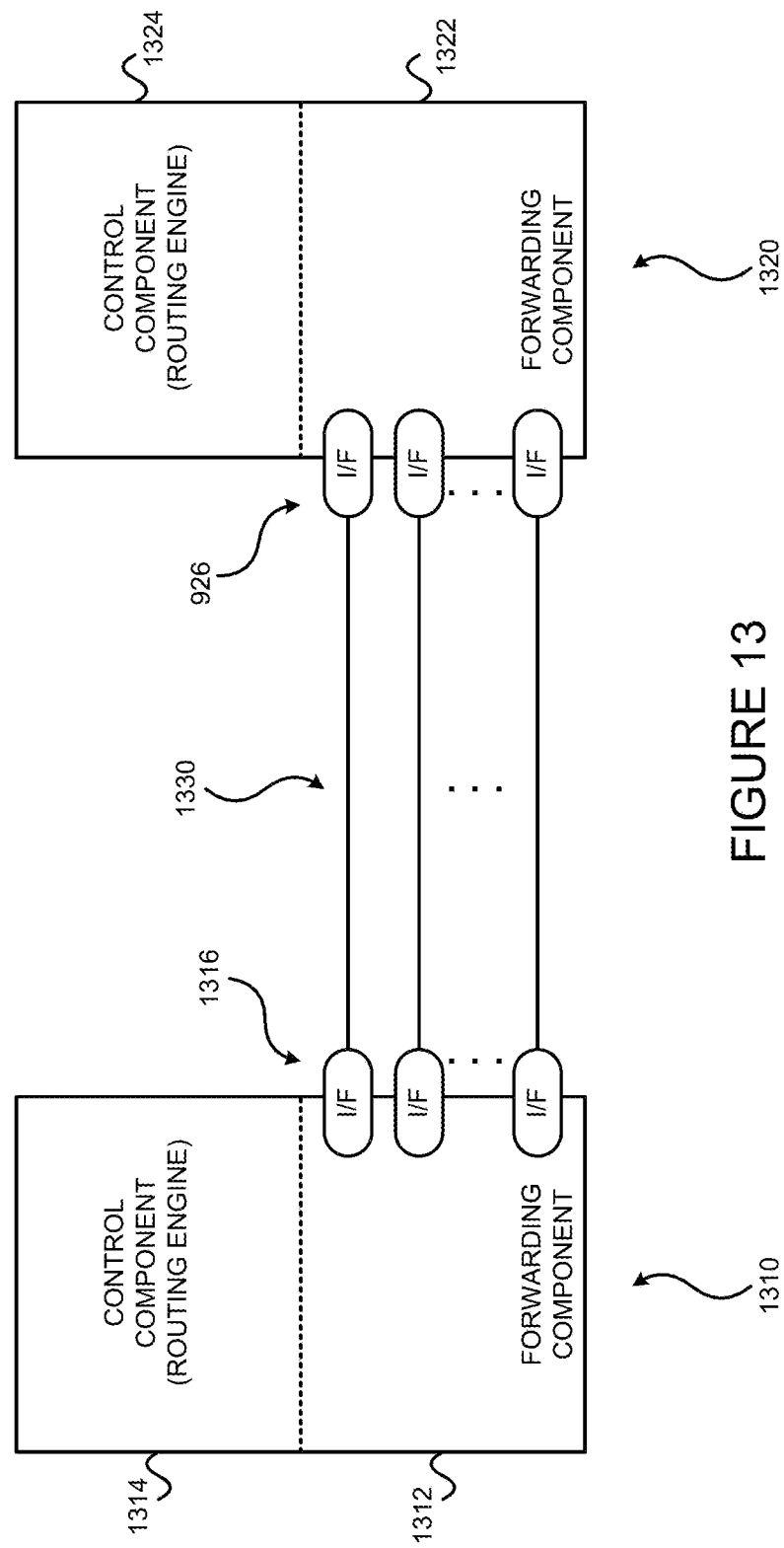
FIG. 13 illustrates two data forwarding systems, which may be used as nodes, coupled via communications links, in a communications network, such as those in FIGS. 8A and 8B.

The PE and/or CE devices may be forwarding devices, such as routers for example. FIG. 13 illustrates two data forwarding systems 1310 and 1320 coupled via communications links 1330. The links may be physical links or "wireless" links. The data forwarding systems 1310,1320 may be routers for example. If the data forwarding systems 1310,1320 are example routers, each may include a control component (e.g., a routing engine) 1314,1324 and a forwarding component 1312,1322. Each data forwarding system 1310,1320 includes one or more interfaces 1316,1326 that terminate one or more communications links 1330.

As just discussed above, and referring to FIG. 14, some example routers 1400 include a control component (e.g., routing engine) 1410 and a packet forwarding component (e.g., a packet forwarding engine) 1490.

The control component 1410 may include an operating system (OS) kernel 1420, routing protocol process(es) 1430, label-based forwarding protocol process(es) 1440, interface process(es) 1450, user interface (e.g., command line interface) process(es) 1460, and chassis process(es) 1470, and may store routing table(s) 1439, label forwarding information 1445, and forwarding (e.g., route-based and/or label-based) table(s) 1480. As shown, the routing protocol process(es) 1430 may support routing protocols such as the routing information protocol ("RIP") 1431, the intermediate system-to-intermediate system protocol ("IS-IS") 1432, the open shortest path first protocol ("OSPF") 1433, the enhanced interior gateway routing protocol ("EIGRP") 1434 and the border gateway protocol ("BGP") 1435, and the label-based forwarding protocol process(es) 1440 may support protocols such as BGP 1435, the label distribution protocol ("LDP") 1436, the resource reservation protocol ("RSVP") 1437, EVPN 1438 and L2VPN 1439. One or more components (not shown) may permit a user 1465 to interact with the user interface process(es) 1460. Similarly, one or more components (not shown) may permit an outside device to interact with one or more of the router protocol process(es) 1430, the label-based forwarding protocol process(es) 1440, the interface process(es) 1450, and the chassis process(es) 1470, via SNMP 1485, and such processes may send information to an outside device via SNMP 1485.

The packet forwarding component 1490 may include a microkernel 1492 over hardware components (e.g., ASICs, switch fabric, optics, etc.) 1491, interface process(es) 1493, ASIC drivers 1494, chassis process(es) 1495 and forwarding (e.g., route-based and/or label-based) table(s) 1496.

Figure 14:
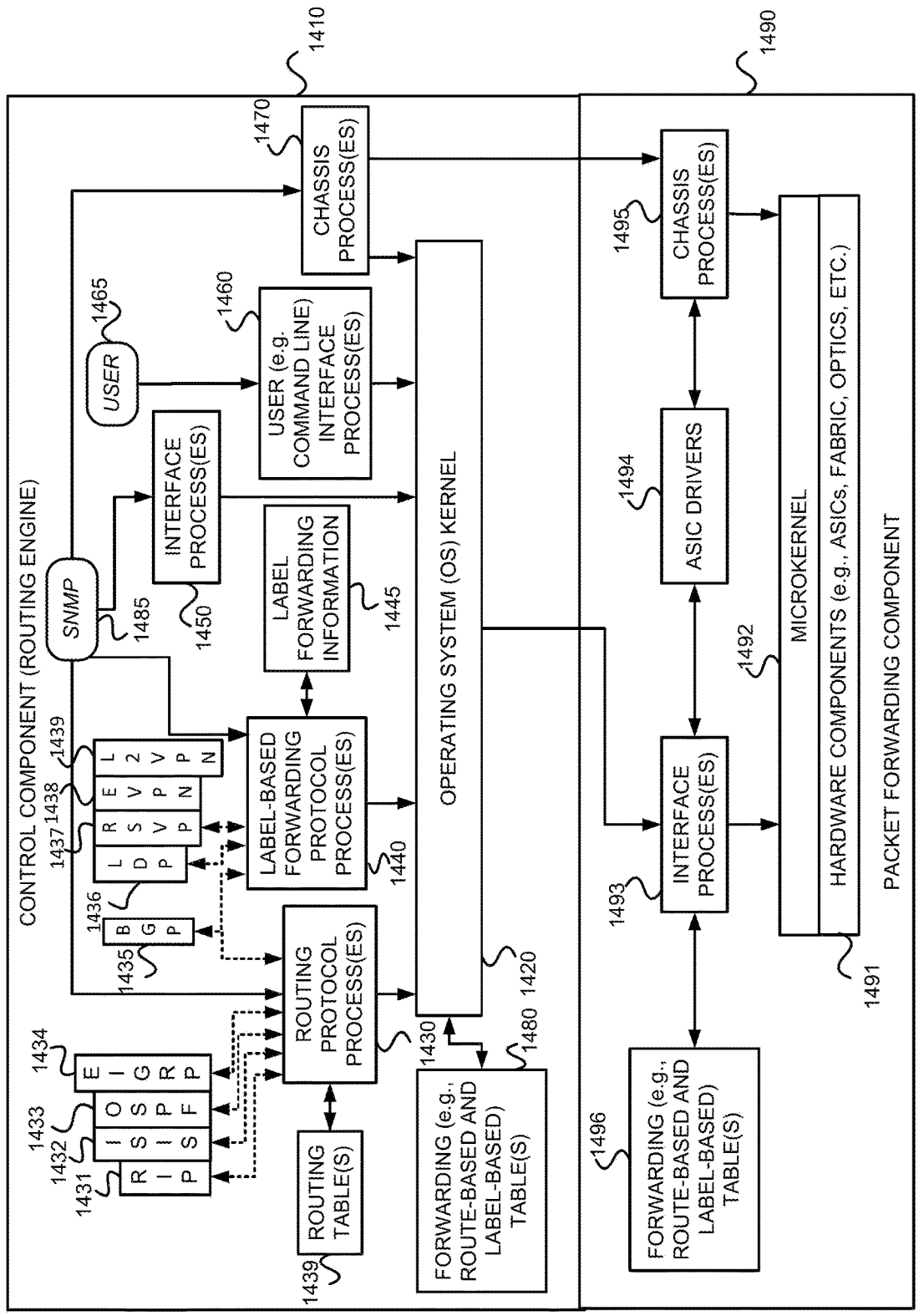
FIG. 14 is a block diagram of a router which may be used a communications network, such as those in FIGS. 8A and 8B.

In the example router 1400 of FIG. 14, the control component 1410 handles tasks such as performing routing protocols, performing label-based forwarding protocols, control packet processing, etc., which frees the packet forwarding component 1490 to forward received packets quickly. That is, received control packets (e.g., routing protocol packets and/or label-based forwarding protocol packets) are not fully processed on the packet forwarding component 1490 itself, but are passed to the control component 1410, thereby reducing the amount of work that the packet forwarding component 1490 has to do and freeing it to process packets to be forwarded efficiently. Thus, the control component 1410 is primarily responsible for running routing protocols and/or label-based forwarding protocols, maintaining the routing tables and/or label forwarding information, sending forwarding table updates to the packet forwarding component 1490, and performing system management. The example control component 1410 may handle routing protocol packets, provide a management interface, provide configuration management, perform accounting, and provide alarms. The processes 1430, 1440, 1450, 1460 and 1470 may be modular, and may interact with the OS kernel 1420. That is, nearly all of the processes communicate directly with the OS kernel 1420. Using modular software that cleanly separates processes from each other isolates problems of a given process so that such problems do not impact other processes that may be running. Additionally, using modular software facilitates easier scaling.

Still referring to FIG. 14, the example OS kernel 1420 may incorporate an application programming interface ("API") system for external program calls and scripting capabilities. The control component 1410 may be based on an Intel PCI platform running the OS from flash memory, with an alternate copy stored on the router's hard disk. The OS kernel 1420 may be layered on the Intel PCI platform and establishes communication between the Intel PCI platform and processes of the control component 1410. The OS kernel 1420 also ensures that the forwarding tables 1496 in use by the packet forwarding component 1490 are in sync with those 1480 in the control component 1410. Thus, in addition to providing the underlying infrastructure to control component 1410 software processes, the OS kernel 1420 also provides a link between the control component 1410 and the packet forwarding component 1490.

Referring to the routing protocol process(es) 1430 of FIG. 14, this process(es) 1430 provides routing and routing control functions within the platform. In this example, the RIP 1431, IS-IS 1432, OSPF 1433 and EIGRP 1434 (and BGP 1435) protocols are provided.

Naturally, other routing protocols may be provided in addition, or alternatively. Similarly, the label-based forwarding protocol process(es) 1440 provides label forwarding and label control functions. In this example, the LDP 1436, RSVP 1437, EVPN 1438 and L2VPN 1439 (and BGP 1435) protocols are provided. Naturally, other label-based forwarding protocols (e.g., MPLS, SR, etc.) may be provided in addition, or alternatively. In the example router 1400, the routing table(s) 1439 is produced by the routing protocol process(es) 1430, while the label forwarding information 1445 is produced by the label-based forwarding protocol process(es) 1440.

Still referring to FIG. 14, the interface process(es) 1450 performs configuration of the physical interfaces and encapsulation.

The example control component 1410 may provide several ways to manage the router. For example, it 1410 may provide a user interface process(es) 1460 which allows a system operator 1465 to interact with the system through configuration, modifications, and monitoring. The SNMP 1485 allows SNMP-capable systems to communicate with the router platform. This also allows the platform to provide necessary SNMP information to external agents. For example, the SNMP 1485 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1410, thereby avoiding slowing traffic forwarding by the packet forwarding component 1490.

Although not shown, the example router 1400 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1460 via a console port, an auxiliary port, and/or a management Ethernet port. (Recall that in some example embodiments, the "designated active" AC for a given MHES may be configured manually.)

The packet forwarding component 1490 is responsible for properly outputting received packets as quickly as possible. If there is no entry in the forwarding table for a given destination or a given label and the packet forwarding component 1490 cannot perform forwarding by itself, it 1490 may send the packets bound for that unknown destination off to the control component 1410 for processing. The example packet forwarding component 1490 is designed to perform Layer 2 and Layer 3 switching, route lookups, and rapid packet forwarding.

As shown in FIG. 14, the example packet forwarding component 1490 has an embedded microkernel 1492 over hardware components 1491, interface process(es) 1493, ASIC drivers 1494, and chassis process(es) 1495, and stores a forwarding (e.g., route-based and/or label-based) table(s) 1496. The microkernel 1492 interacts with the interface process(es) 1493 and the chassis process(es) 1495 to monitor and control these functions. The interface process(es) 1492 has direct communication with the OS kernel 1420 of the control component 1410. This communication includes forwarding exception packets and control packets to the control component 1410, receiving packets to be forwarded, receiving forwarding table updates, providing information about the health of the packet forwarding component 1490 to the control component 1410, and permitting configuration of the interfaces from the user interface (e.g., CLI) process(es) 1460 of the control component 1410. The stored forwarding table(s) 1496 is static until a new one is received from the control component 1410. The interface process(es) 1493 uses the forwarding table(s) 1496 to look up next-hop information. The interface process(es) 1493 also has direct communication with the distributed ASICs. Finally, the chassis process(es) 1495 may communicate directly with the microkernel 1492 and with the ASIC drivers 1494.

Figure 15:
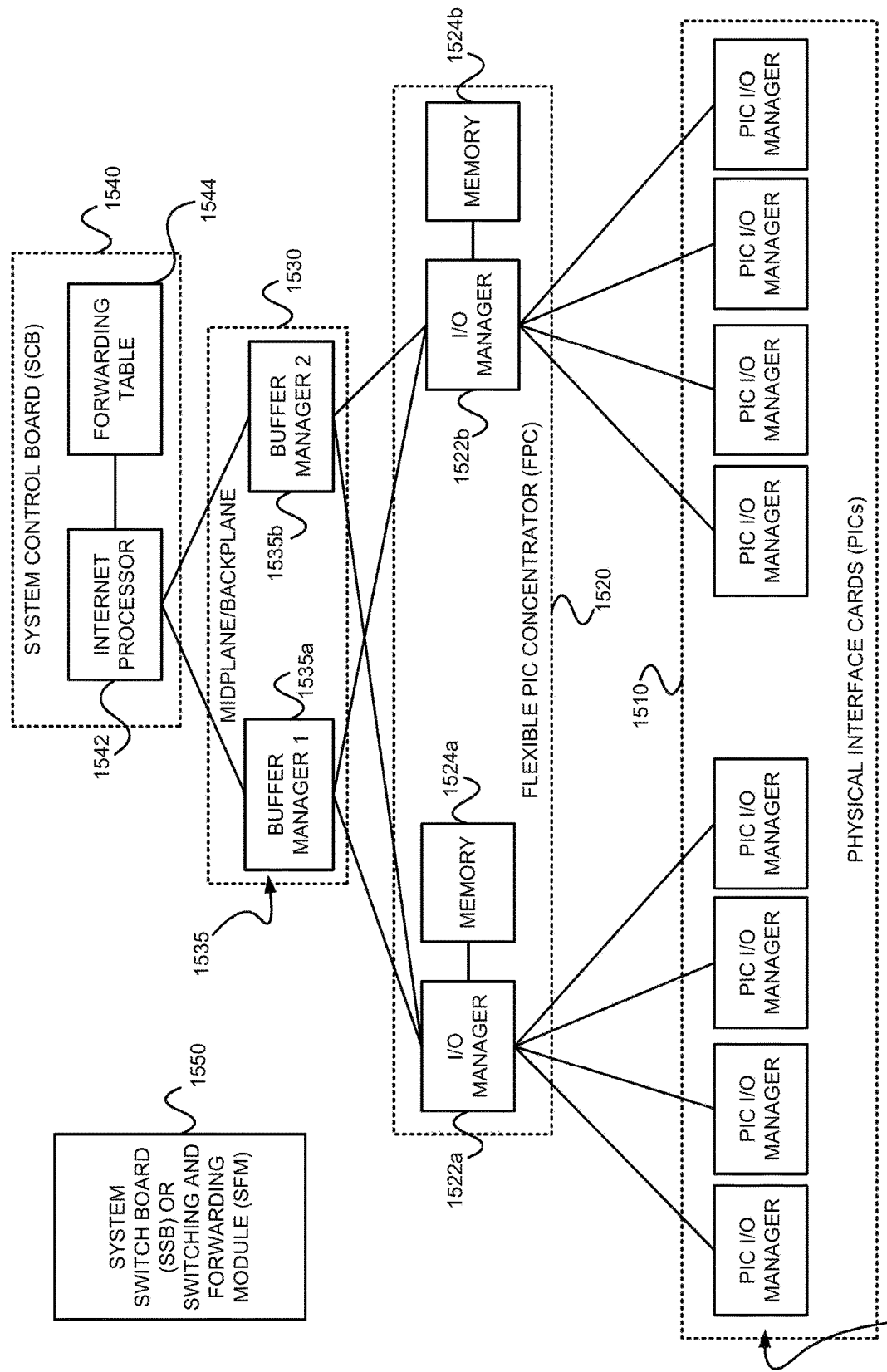
FIG. 15 is an example architecture in which ASICS may be distributed in a packet forwarding component to divide the responsibility of packet forwarding.

FIG. 15 is an example of how the ASICS may be distributed in the packet forwarding component 1490 to divide the responsibility of packet forwarding. As shown in FIG. 15, the ASICs of the packet forwarding component 1490 may be distributed on physical interface cards ("PICs") 1510, flexible PIC concentrators ("FPCs") 1520, a midplane or backplane 1530, and a system control board(s) 1540 (for switching and/or forwarding). Switching fabric is also shown as a system switch board ("SSB"), or a switching and forwarding module ("SFM") 1550 (which may be a switch fabric 1550' as shown in FIGS. 16A and 16B). Each of the PICs 1510 includes one or more PIC I/O managers 1515.

Each of the FPCs 1520 includes one or more I/O managers 1522, each with an associated memory 1524 (which may be a RDRAM 1524' as shown in FIGS. 16A and 16B). The midplane/backplane 1530 includes buffer managers 1535a, 1535b. Finally, the system control board 1540 includes an internet processor 1542 and an instance of the forwarding table 1544 (Recall, e.g., 1496 of FIG. 14).

Still referring to FIG. 15, the PICs 1510 contain the interface ports. Each PIC 1510 may be plugged into an FPC 1520. Each individual PIC 1510 may contain an ASIC that handles media-specific functions, such as framing or encapsulation. Some example PICs 1510 provide SDH/SONET, ATM, Gigabit Ethernet, Fast Ethernet, and/or DS3/E3 interface ports.

An FPC 1520 can contain from one or more PICs 1510, and may carry the signals from the PICs 1510 to the midplane/backplane 1530 as shown in FIG. 15.

The midplane/backplane 1530 holds the line cards. The line cards may connect into the midplane/backplane 1530 when inserted into the example router's chassis from the front. The control component (e.g., routing engine) 1410 may plug into the rear of the midplane/backplane 1530 from the rear of the chassis. The midplane/backplane 1530 may carry electrical (or optical) signals and power to each line card and to the control component 1410.

The system control board 1540 may perform forwarding lookup. It 1540 may also communicate errors to the routing engine. Further, it 1540 may also monitor the condition of the router based on information it receives from sensors. If an abnormal condition is detected, the system control board 1540 may immediately notify the control component 1410.

Referring to FIGS. 15, 16A and 16B, in some exemplary routers, each of the PICs 1510,1510' contains at least one I/O manager ASIC 1515 responsible for media-specific tasks, such as encapsulation. The packets pass through these I/O ASICs on their way into and out of the router. The I/O manager ASIC 1515 on the PIC 1510,1510' is responsible for managing the connection to the I/O manager ASIC 1522 on the FPC 1520,1520', managing link-layer framing and creating the bit stream, performing cyclical redundancy checks (CRCs), and detecting link-layer errors and generating alarms, when appropriate. The FPC 1520 includes another I/O manager ASIC 1522. This ASIC 1522 (shown as a layer 2/layer 3 packet processing component 1510'/1520') takes the packets from the PICs 1510 and breaks them into (e.g., 74-byte) memory blocks. This FPC I/O manager ASIC 1522 (shown as a layer 2/layer 3 packet processing component 1510'/1520') sends the blocks to a first distributed buffer manager (DBM) 935a (shown as switch interface component 1535a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 1535/1535a' manages and writes packets to the shared memory 1524 across all FPCs 1520. In parallel, the first DBM ASIC 1535/1535a' also extracts information on the destination of the packet and passes this forwarding-related information to the Internet processor 1542/1542'. The Internet processor 1542/1542' performs the route lookup using the forwarding table 1544 and sends the information over to a second DBM ASIC 1535b'. The Internet processor ASIC 1542/1542' also collects exception packets (i.e., those without a forwarding table entry) and sends them to the control component 1410. The second DBM ASIC 1525 (shown as a queuing and memory interface component 1535b') then takes this information and the 74-byte blocks and forwards them to the I/O manager ASIC 1522 of the egress FPC 1520/1520' (or multiple egress FPCs, in the case of multicast) for reassembly. (Thus, the DBM ASICs 1535a/1535a' and 1535b/1535b' are responsible for managing the packet memory 1524/1524' distributed across all FPCs 1520/1520', extracting forwarding-related information from packets, and instructing the FPC where to forward packets.)

The I/O manager ASIC 1522 on the egress FPC 1520/1520' may perform some value-added services. In addition to incrementing time to live ("TTL") values and re-encapsulating the packet for handling by the PIC 1510, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1522 on the egress FPC 1520/1520' may be responsible for receiving the blocks from the second DBM ASIC 1535/1535', incrementing TTL values, queuing a pointer to the packet, if necessary, before applying CoS rules, re-encapsulating the blocks, and sending the encapsulated packets to the PIC I/O manager ASIC 1515.

Figure 17:
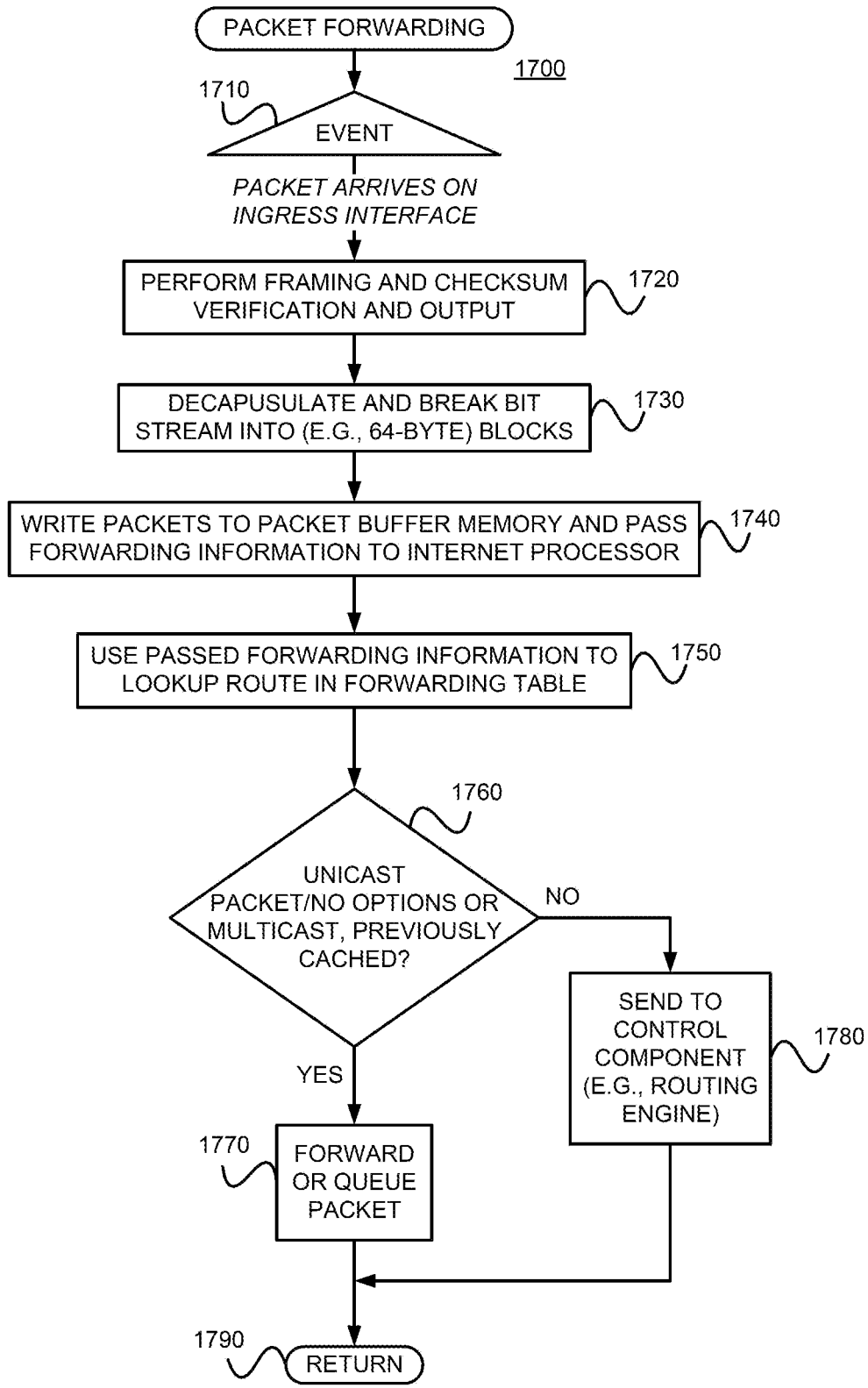
FIG. 17 is a flow diagram of an example method for providing packet forwarding in an example router.

FIG. 17 is a flow diagram of an example method 1700 for providing packet forwarding in the example router. The main acts of the method 1700 are triggered when a packet is received on an ingress (incoming) port or interface. (Event 1710) The types of checksum and frame checks that are required by the type of medium it serves are performed and the packet is output, as a serial bit stream. (Block 1720) The packet is then decapsulated and parsed into (e.g., 64-byte) blocks. (Block 1730) The packets are written to buffer memory and the forwarding information is passed on the Internet processor. (Block 1740) The passed forwarding information is then used to lookup a route in the forwarding table. (Block 1750) Note that the forwarding table can typically handle unicast packets that do not have options (e.g., accounting) set, and multicast packets for which it already has a cached entry. Thus, if it is determined that these conditions are met (YES branch of Decision 1760), the packet forwarding component finds the next hop and egress interface, and the packet is forwarded (or queued for forwarding) to the next hop via the egress interface (Block 1770) before the method 1700 is left (Node 1790) Otherwise, if these conditions are not met (NO branch of Decision 1760), the forwarding information is sent to the control component 1410 for advanced forwarding resolution (Block 1780) before the method 1700 is left (Node 1790).

Referring back to block 1770, the packet may be queued. Actually, as stated earlier with reference to FIG. 15, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1522 may send a request for the packet to the second DBM ASIC 1535b. The DBM ASIC 1535 reads the blocks from shared memory and sends them to the I/O manager ASIC 1522 on the FPC 1520, which then serializes the bits and sends them to the media-specific ASIC of the egress interface. The I/O manager ASIC 1515 on the egress PIC 1510 may apply the physical-layer framing, perform the CRC, and send the bit stream out over the link.

Referring back to block 1780 of FIG. 17, as well as FIG. 15, regarding the transfer of control and exception packets, the system control board 1540 handles nearly all exception packets. For example, the system control board 1540 may pass exception packets to the control component 1410.

Although example embodiments consistent with the present description may be implemented on the example routers of FIG. 13 or 14, embodiments consistent with the present description may be implemented on communications network nodes (e.g., routers, switches, etc.) having different architectures. More generally, embodiments consistent with the present description may be implemented on an example system 1800 as illustrated on FIG. 18.

Figure 18:
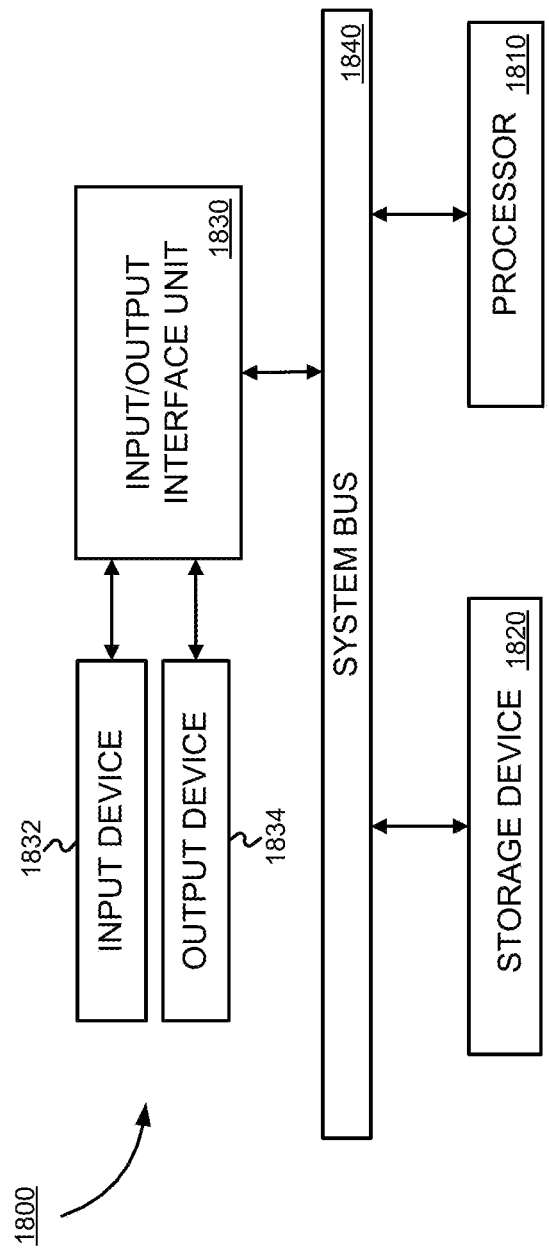
FIG. 18 is a block diagram of an exemplary machine that may perform one or more of the processes described, and/or store information used and/or generated by such processes.

FIG. 18 is a block diagram of an exemplary machine 1800 that may perform one or more of the processes described, and/or store information used and/or generated by such processes. The exemplary machine 1800 includes one or more processors 1810, one or more input/output interface units 1830, one or more storage devices 1820, and one or more system buses and/or networks 1840 for facilitating the communication of information among the coupled elements. One or more input devices 1832 and one or more output devices 1834 may be coupled with the one or more input/output interfaces 1830. The one or more processors 1810 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1820 and/or may be received from an external source via one or more input interface units 1830. The machine executable instructions may be stored as various software modules, each module performing one or more operations. Functional software modules are examples of components of the present description.

In some embodiments consistent with the present description, the processors 1810 may be one or more microprocessors and/or ASICs. The bus 1840 may include a system bus. The storage devices 1820 may include system memory, such as read only memory (ROM) and/or random-access memory (RAM). The storage devices 1820 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.7 CONCLUSIONS

As can be appreciated by the foregoing, example embodiments consistent with the present invention avoid potential problems of core isolation in a way that also avoids the potential "split brain" problems.

What is claimed is:

1. A computer-implemented method for use in an EVPN (Ethernet Virtual Private Network) including a first EVPN provider edge (PE) device and a second EVPN PE device, wherein each of the first and second EVPN PE devices is configured to have at least one peering session to share, directly or indirectly, routing information with each other and/or with any other EVPN PE device in the EVPN, and wherein the first EVPN PE device has a first attachment circuit (AC) and the second EVPN peer device has a second AC to a first multi-homed Ethernet segment (MHES) having an Ethernet Segment Identifier ESI, the computer-implemented method comprising:

a) defining the first AC as "designated active" and the second AC as not "designated active" such that only the first AC is "designated active" for the MHES;

b) configuring the first EVPN PE device such that, responsive to a determination that each of its at least one peering session is down whereby the first EVPN PE device is unable to share routing information with any other EVPN PE device in the EVPN, the first AC is allowed to remain UP because the first AC is "designated active";

c) configuring the second EVPN PE device such that, responsive to a determination that each of its at least one peering session is down whereby the second EVPN PE device is unable to share routing information with any other EVPN PE device in the EVPN, the second AC is brought into a STANDBY or DOWN state because the second AC is not "designated active"; and d) responsive to a determination that some or all of at least one peering session of the second EVPN peer device transitions from down to up, whereby the second EVPN PE device becomes able to share routing information with any other EVPN PE device in the EVPN after having not been able to share routing information with any other EVPN PE device of the EVPN, 1) determining if routing information in the second EVPN PE device matches, to a predetermined degree, routing information in the first EVPN PE device, and 2) responsive to a determination that the routing information in the second EVPN PE device matches, to the predetermined degree, the routing information in the first EVPN PE device, brining the not "designated active" second AC UP, and otherwise, responsive to a determination that the routing information in the second EVPN PE device does not match, to the predetermined degree, the routing information in the first EVPN PE device, leaving the not "designated active" second AC DOWN or in STANDBY.

2. The computer-implemented method of claim 1 wherein the determining if routing information in the second EVPN PE device matches, to a predetermined degree, routing information in the first EVPN PE device compares routing information in forwarding planes of the first and second EVPN PE devices.

3. The computer-implemented method of claim 1, wherein the first AC is defined as "designated active" manually.

4. The computer-implemented method of claim 1, wherein the first AC is automatically determined as "designated active" using a predetermined election procedure.

5. The computer-implemented method of claim 1, wherein the act of configuring the first EVPN PE device such that, responsive to a determination that each of its at least one peering session is down whereby the first EVPN PE device is unable to share routing information with any other EVPN PE device in the EVPN, the first AC is allowed to remain UP because the first AC is "designated active" is performed by disabling core isolation action in the first EVPN peer device via manual configuration.

6. The computer-implemented method of claim 1, wherein the act of determining if routing information in the second EVPN PE device matches, to a predetermined degree, routing information in the first EVPN PE device, uses at least one CE-IP ping message between the first EVPN PE device and the second EVPN PE device to share route metrics.

7. The computer-implemented method of claim 6, wherein the act determining if routing information in the second EVPN PE device matches, to a predetermined degree, routing information in the first EVPN PE device, includes determining whether each of the at least one of (A) a number of IPv4 MAC-IP entries, (B) a number of IPv6 MAC-IP entries, (C) a number of MAC entries, and/or (D) multicast route information, is within a predetermined percent of the corresponding number in the one of the first and second EVPN PE device.

8. The computer-implemented method of claim 6, wherein the at least one CE-IP ping message includes a sub-TLV including at least one of (A) a number of IPv4 MAC-IP entries, (B) a number of IPv6 MAC-IP entries, (C) a number of MAC entries, and/or (D) multicast route information.

9. The computer-implemented method of claim 6, wherein the at least one CE-IP ping message includes a sub-TLV defining a number of MHESes or ESIs, and for each of the MHESes or ESIs, at least one of (A) a number of IPv4 MAC-IP entries, (B) a number of IPv6 MAC-IP entries, (C) a number of MAC entries, and/or (D) multicast route information.

10. The computer-implemented method of claim 1, wherein the act determining if routing information, in the second EVPN PE device matches, to a predetermined degree, routing information, in the first EVPN PE device, is based on the presence or absence of a BGP End-of-RIB marker.

11. The computer-implemented method of claim 1, wherein the act determining if routing information in the second EVPN PE device matches, to a predetermined degree, routing information in the first EVPN PE device, is based on both (1) the presence or absence of a BGP End-of-RIB marker, and (2) a determination of whether routes from the routing information are programmed into a packet forwarding engine (PFE).

12. The computer-implemented method of claim 1, wherein the first and second EVPN PE devices are leaf nodes of a Clos network, and wherein the first device is a top-of-rack (TOR) device.

13. The computer-implemented method of claim 1, wherein the first and second EVPN PE devices are spine nodes of a Clos network, and wherein the first network device is a leaf node in the Clos network.

14. The computer-implemented method of claim 1, wherein the first and second EVPN PE devices are provider edge (PE) devices, and wherein the first network device is a customer edge (CE) device.

15. The computer-implemented method of claim 1, wherein each of the first and second EVPN PE devices is an end point of a virtual tunnel in a VXLAN.

16. The computer-implemented method of claim 1, wherein the first and second EVPN PE devices are iBGP peers or eBGP peers.

17. The computer-implemented method of claim 1, wherein the first EVPN PE device has a third AC and the second EVPN PE has a fourth AC to a second MHES having a second ESI the computer-implemented method further comprising:

e) defining one and only one of the third AC and the fourth AC as "designated active" and all other one(s) of the third AC and the fourth AC as not "designated active," whereby there is only one "designated active" AC per ESI;

f) responsive to a determination that each of its at least one peering session is down whereby the first EVPN PE device is unable to share routing information with any other EVPN PE device in the EVPN, for each of the first AC and the third AC, and for each of the first and second MHES, 1) allowing the designated active AC for the given MHES to remain UP, and 2) bringing the not designated active AC for the given MHES DOWN or into STANDBY;

g) responsive to a determination that each of its at least one peering session is down whereby the second EVPN PE device is unable to share routing information with any other EVPN PE device in the EVPN, for each of the second AC and the fourth AC, and for each of the first and second MHES, 1) allowing the designated active AC for the given MHES to remain UP, and 2) bringing the not designated active AC for the given MHES DOWN or into STANDBY;

h) responsive to a determination that some or all of at least one peering session of the second EVPN peer device transitions from down to up, whereby the second EVPN PE device becomes able to share routing information with any other EVPN PE device in the EVPN after having not been able to share routing information with any other EVPN PE device of the EVPN, 1) determining if routing information in the second EVPN PE device matches, to a predetermined degree, routing information in the first EVPN PE device, and
2) responsive to a determination that the routing information in the second EVPN PE device matches, to the predetermined degree, the routing information in the first EVPN PE device,
brining any not "designated active" AC on the second EVPN PE device for a given MHES UP, and
otherwise, responsive to a determination that the routing information in the second EVPN PE device does not match, to the predetermined degree, the routing information in the first EVPN PE device,
leaving any not "designated active" AC on the second EVPN PE device for the given MHES DOWN or in STANDBY.

18. The computer-implemented method of claim 17, further comprising:
i) responsive to a determination that some or all of at least one peering session of the first EVPN peer device transitions from down to up, whereby the first EVPN PE device becomes able to share routing information with any other EVPN PE device in the EVPN after having not been able to share routing information with any other EVPN PE device of the EVPN,
1) determining if routing information in the first EVPN PE device matches, to a predetermined degree, routing information in the second EVPN PE device, and
2) responsive to a determination that the routing information in the first EVPN PE device matches, to the predetermined degree, the routing information in the second EVPN PE device,
brining any not "designated active" AC on the first EVPN PE device for the given MHES UP, and
otherwise, responsive to a determination that the routing information in the first EVPN PE device does not match, to the predetermined degree, the routing information in the second EVPN PE device,
leaving any not "designated active" AC on the first EVPN PE device for the given MHES DOWN or in STANDBY.

19. An EVPN provider edge (PE) device for use in an EVPN including another EVPN PE device, wherein each of the EVPN PE devices are configured to have at least one peering session to share, directly or indirectly, routing information with each other and with any other EVPN PE device in the EVPN, and wherein the EVPN PE device has a first attachment circuit (AC) and the other EVPN peer device has a second AC to a first multi-homed Ethernet segment (MHES) having an Ethernet Segment Identifier ESI, the EVPN PE device comprising:
a) at least one processor; and
b) a storage system storing processor-executable instructions which, when executed by the at least one processor, cause the at least one processor to perform a method including
1) defining one and only one of the first AC and the second AC as "designated active" and the other of the first AC and the second AC as not "designated active" such that only one AC is "designated active" for the MHES;
2) configuring the EVPN PE device such that, responsive to a determination that each of its at least one peering session is down whereby the first EVPN PE device is unable to share routing information with any other EVPN PE device in the EVPN,
if the first AC is "designated active", it is allowed to remain UP, and
otherwise, if the first AC is not "designated active", it is brought into a STANDBY or DOWN state,
3) responsive to a determination that some or all of at least one peering session of the EVPN peer device transitions from down to up, whereby the EVPN PE device becomes able to share routing information with any other EVPN PE device in the EVPN after having not been able to share routing information with any other EVPN PE device of the EVPN,
determining if routing information in the EVPN PE device matches, to a predetermined degree, routing information in the other EVPN PE device, and
responsive to a determination that the routing information in the EVPN PE device matches, to the predetermined degree, the routing information in the other EVPN PE device,
brining any not "designated active" AC UP, and
otherwise, responsive to a determination that the routing information in the EVPN PE device does not match, to the predetermined degree, the routing information in the other EVPN PE device,
leaving any not "designated active" AC DOWN or in STANDBY.

20. A non-transitory computer-readable storage medium storing processor-executable instructions which, when executed by at least one processor, cause the at least one processor to perform a method for use in an EVPN including a first EVPN provider edge (PE) device and a second EVPN PE device, wherein each of the first and second EVPN PE devices is configured to have at least one peering session to share, directly or indirectly, routing information with each other and/or with any other EVPN PE device in the EVPN, and wherein the first EVPN PE device has a first attachment circuit (AC) and the second EVPN peer device has a second AC to a first multi-homed Ethernet segment (MHES) having an Ethernet Segment Identifier ESI, the method comprising:
a) defining the first AC as "designated active" and the second AC as not "designated active" such that only the first AC is "designated active" for the MHES;
b) configuring the first EVPN PE device such that, responsive to a determination that each of its at least one peering session is down whereby the first EVPN PE device is unable to share routing information with any other EVPN PE device in the EVPN, the first AC is allowed to remain UP because the first AC is "designated active";
c) configuring the second EVPN PE device such that, responsive to a determination that each of its at least one peering session is down whereby the second EVPN PE device is unable to share routing information with any other EVPN PE device in the EVPN, the second AC is brought into a STANDBY or DOWN state because the second AC is not "designated active"; and
d) responsive to a determination that some or all of at least one peering session of the second EVPN peer device transitions from down to up, whereby the second EVPN PE device becomes able to share routing information with any other EVPN PE device in the EVPN after having not been able to share routing information with any other EVPN PE device of the EVPN,
1) determining if routing information in the second EVPN PE device matches, to a predetermined degree, routing information in the first EVPN PE device, and 2) responsive to a determination that the routing information in the second EVPN PE device matches, to the predetermined degree, the routing information in the first EVPN PE device,
   brining the not "designated active" second AC UP, and
otherwise, responsive to a determination that the routing information in the second EVPN PE device does not match, to the predetermined degree, the routing information in the first EVPN PE device,
   leaving the not "designated active" second AC DOWN or in STANDBY.

\* \* \* \* \*